US012688438B2

(12) United States Patent　　　　　(10) Patent No.:　　US 12,688,438 B2
Ghelichi et al.　　　　　　　　　　　　　(45) Date of Patent:　　　　Jul. 21, 2026

(54) DYNAMICALLY MONITORING VARIATIONS IN PROCESS EXPLAINABILITY WITHIN A DISTRIBUTED COMPUTING ENVIRONMENT

(71) Applicant: The Toronto-Dominion Bank, Toronto (CA)

(72) Inventors: Mahdi Ghelichi, Toronto (CA); Talieh Tabatabaei, Richmond Hill (CA); Julie R. Melanson, Toronto (CA); Jesse Cole Cresswell, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 518 days.

(21) Appl. No.: 18/208,039

(22) Filed: Jun. 9, 2023

(65) Prior Publication Data

US 2024/0412078 A1　　　Dec. 12, 2024

(51) Int. Cl.
*G06N 5/022*　　　　　(2023.01)
*G06N 5/045*　　　　　(2023.01)

(52) U.S. Cl.
CPC .............. *G06N 5/022* (2013.01); *G06N 5/045* (2013.01)

(58) Field of Classification Search
CPC .......... G06N 5/022; G06N 5/045; G06N 5/01; G06N 20/00
See application file for complete search history.

(56) References Cited

U.S. PATENT DOCUMENTS

| | | | |
|---|---|---|---|
| 2022/0284499 A1* | 9/2022 | Dornadula | G06Q 30/0244 |
| 2023/0267468 A1* | 8/2023 | Tholar | G06Q 90/00 |
| | | | 706/12 |
| 2023/0282129 A1* | 9/2023 | Delisle | G09B 9/08 |
| 2023/0325692 A1* | 10/2023 | Confortola | G06N 5/045 |
| | | | 706/45 |
| 2023/0334343 A1* | 10/2023 | Khasanova | G06N 5/04 |
| 2023/0353447 A1* | 11/2023 | Vaderna | G06F 11/008 |
| 2024/0086704 A1* | 3/2024 | Teixeira Nogueira | |
| | | | G06T 13/40 |
| 2024/0106766 A1* | 3/2024 | Wang | H04L 41/0806 |
| 2024/0171452 A1* | 5/2024 | Horemuz | H04L 41/0645 |
| 2024/0177071 A1* | 5/2024 | Wang | G06N 3/0442 |

* cited by examiner

*Primary Examiner* — Khalid M Almaghayreh

(74) *Attorney, Agent, or Firm* — Nixon Peabody LLP

(57)　　　　　ABSTRACT

The disclosed embodiments include computer-implemented systems and processes that dynamically monitor variations in process explainability of within a distributed computing environment. For example, an apparatus may obtain first and second explainability data associated with corresponding first and second temporal intervals, and based on the first and second explainability data, determine a value of a metric that characterizes a variation in the explainability of a machine-learning process between the first and second temporal intervals. When the metric value is inconsistent an exception criterion, the apparatus may obtain at least one additional value of the metric associated with a third temporal interval, and when the at least one additional metric value is inconsistent with the exception criterion, the apparatus may perform operations that modify at least one of (i) a value of a process parameter of the machine-learning process or (ii) a composition of an input dataset of the machine-learning process.

18 Claims, 12 Drawing Sheets

100 ⟶

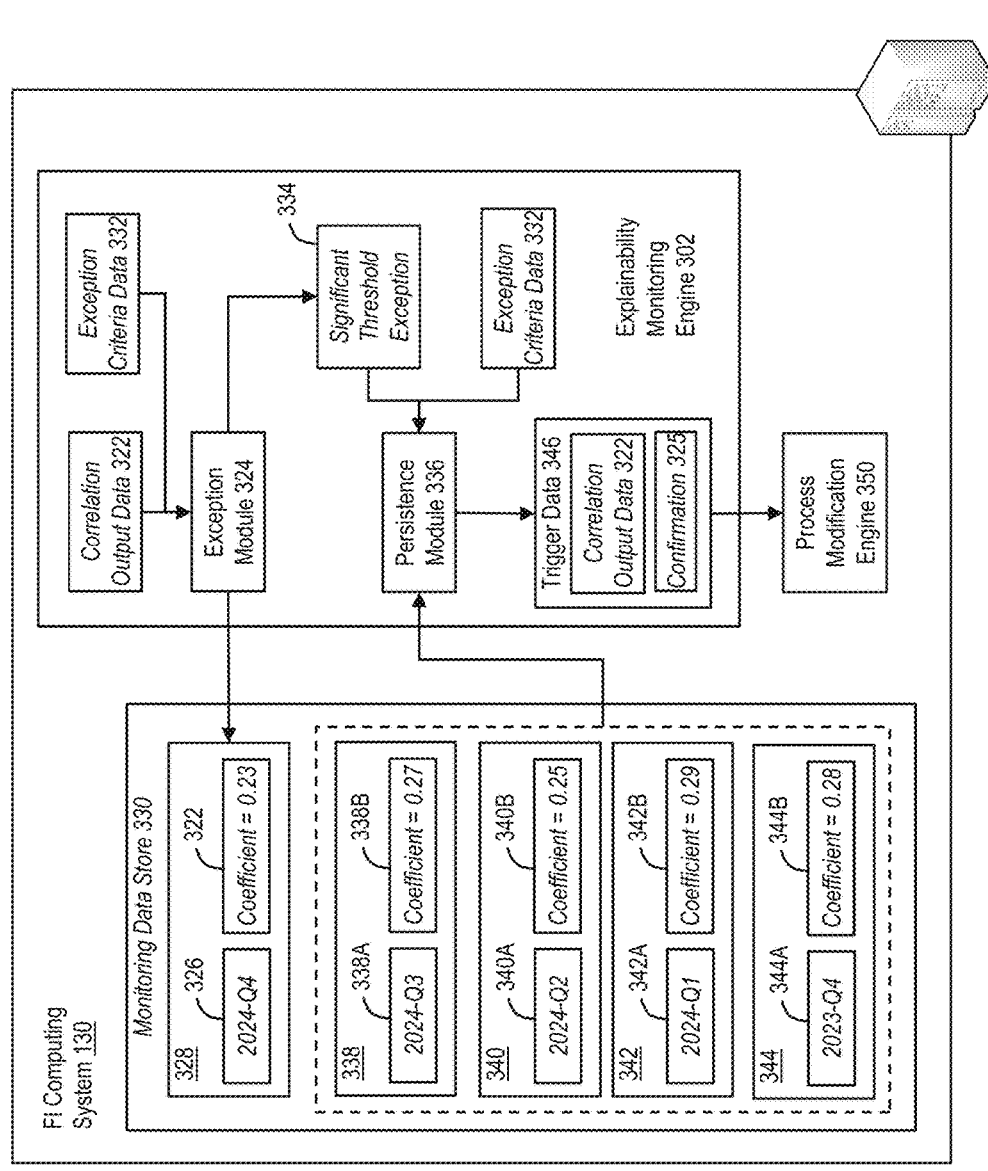
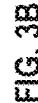
FIG. 3B

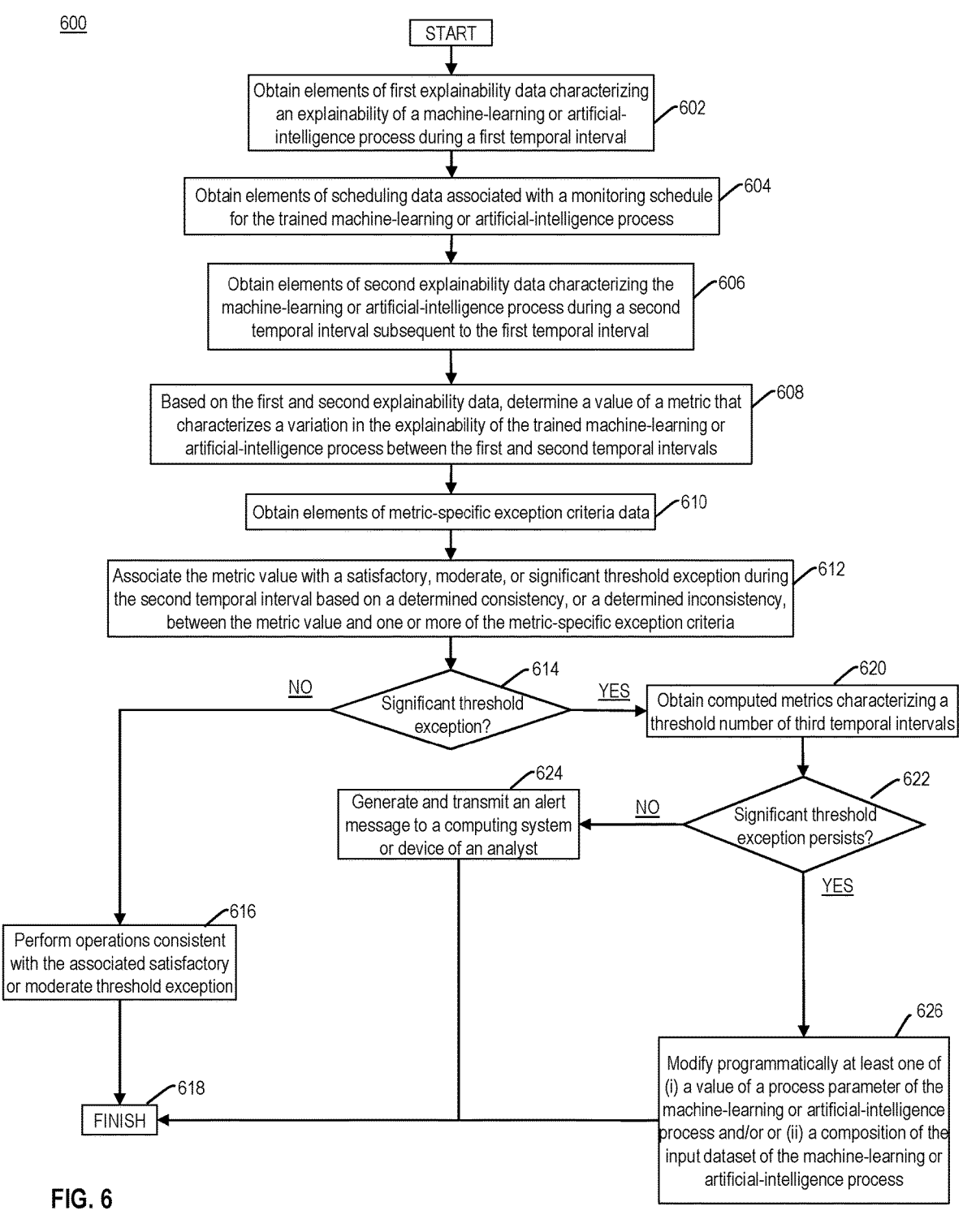

START

Obtain elements of first explainability data characterizing an explainability of a machine-learning or artificial-intelligence process during a first temporal interval ⟋602

Obtain elements of scheduling data associated with a monitoring schedule for the trained machine-learning or artificial-intelligence process ⟋604

Obtain elements of second explainability data characterizing the machine-learning or artificial-intelligence process during a second temporal interval subsequent to the first temporal interval ⟋606

Based on the first and second explainability data, determine a value of a metric that characterizes a variation in the explainability of the trained machine-learning or artificial-intelligence process between the first and second temporal intervals ⟋608

Obtain elements of metric-specific exception criteria data ⟋610

Associate the metric value with a satisfactory, moderate, or significant threshold exception during the second temporal interval based on a determined consistency, or a determined inconsistency, between the metric value and one or more of the metric-specific exception criteria ⟋612

NO ← Significant threshold exception? ⟋614 → YES → Obtain computed metrics characterizing a threshold number of third temporal intervals ⟋620

Generate and transmit an alert message to a computing system or device of an analyst ⟋624 ← NO — Significant threshold exception persists? ⟋622

YES

Perform operations consistent with the associated satisfactory or moderate threshold exception ⟋616

FINISH ⟋618

Modify programmatically at least one of (i) a value of a process parameter of the machine-learning or artificial-intelligence process and/or or (ii) a composition of the input dataset of the machine-learning or artificial-intelligence process ⟋626

FIG. 6

DYNAMICALLY MONITORING VARIATIONS IN PROCESS EXPLAINABILITY WITHIN A DISTRIBUTED COMPUTING ENVIRONMENT

TECHNICAL FIELD

The disclosed embodiments generally relate to computer-implemented systems and processes that dynamically monitoring variations in process explainability of within a distributed computing environment.

BACKGROUND

Machine-learning and artificial-intelligence processes are widely adopted throughout various industries, and an output of these machine learning and artificial intelligence process may inform decisions associated with a targeted marketing of products and services to existing and prospective customers of these industries, or a suspiciousness of certain activities performed by these existing and prospective customers of these industries. By way of example, an organization may include multiple business units, and each of the business units may develop, adaptively train, and then deploy, one or more trained artificial intelligence or machine learning processes that generate elements of output data consistent with the needs of that business unit and on a schedule appropriate to those needs.

SUMMARY

In some examples, an apparatus includes a memory storing instructions, and at least one processor coupled to the memory. The at least one processor is configured to execute the instructions to obtain first data characterizing an explainability of a machine-learning or artificial-intelligence process during a first temporal interval, and obtain second data characterizing the explainability of the machine-learning or artificial-intelligence process during a second temporal interval. In some examples, the second temporal interval being subsequent to the first temporal interval. Based on the first and second explainability data, the at least one processor is further configured to determine a value of a metric that characterizes a variation in the explainability of the machine-learning or artificial-intelligence process between the first and second temporal intervals, and when the metric value is inconsistent an exception criterion associated with the machine-learning or artificial-intelligence process, the at least one processor is further configured to obtain at least one additional value of the metric that characterizes an additional variation in the explainability of the machine-learning or artificial-intelligence process between the first temporal interval and a corresponding third temporal interval. The third temporal interval is subsequent to the first temporal interval and prior to the second temporal interval. When the at least one additional metric value is inconsistent with the exception criterion, the at least one processor is further configured to perform operations that modify at least one of (i) a value of a process parameter that characterizes the machine-learning or artificial-intelligence process or (ii) a composition of an input dataset associated with the machine-learning or artificial-intelligence process.

In other examples, a computer-implemented method includes obtaining, using at least one processor, first data characterizing an explainability of a machine-learning or artificial-intelligence process during a first temporal interval, and second data characterizing the explainability of the machine-learning or artificial-intelligence process during a second temporal interval. The second temporal interval is subsequent to the first temporal interval. Based on the first and second explainability data, the computer-implemented method also includes determining, using the at least one processor, a value of a metric that characterizes a variation in the explainability of the machine-learning or artificial-intelligence process between the first and second temporal intervals, and when the metric value is inconsistent with an exception criterion associated with the machine-learning or artificial-intelligence process, the computer-implemented method also includes obtaining, using the at least one processor, at least one additional value of the metric characterizing an additional variation in the explainability of the machine-learning or artificial-intelligence process between the first temporal interval and a corresponding third temporal interval. The third temporal interval is subsequent to the first temporal interval and prior to the second temporal interval. When the at least one additional metric value is inconsistent with the exception criterion, the computer-implemented method also includes performing operations, using the at least one processor, that modify at least one of (i) a value of a process parameter that characterizes the machine-learning or artificial-intelligence process or (ii) a composition of an input dataset associated with the machine-learning or artificial-intelligence process.

Further, in some example, a tangible, non-transitory computer-readable medium stores instructions that, when executed by at least one processor, cause the at least one processor to perform a method that includes obtaining first data characterizing an explainability of a machine-learning or artificial-intelligence process during a first temporal interval, and second data characterizing the explainability of the machine-learning or artificial-intelligence process during a second temporal interval. The second temporal interval is subsequent to the first temporal interval. The method also includes, based on the first and second explainability data, determining a value of a metric that characterizes a variation in the explainability of the machine-learning or artificial-intelligence process between the first and second temporal intervals, and when the metric value is inconsistent with an exception criterion associated with the machine-learning or artificial-intelligence process, the method also includes obtaining at least one additional value of the metric characterizing an additional variation in the explainability of the machine-learning or artificial-intelligence process between the first temporal interval and a corresponding third temporal interval. In some instances. The third temporal interval is subsequent to the first temporal interval and prior to the second temporal interval. When the at least one additional metric value is inconsistent with the exception criterion, the method also includes performing operations that modify at least one of (i) a value of a process parameter that characterizes the machine-learning or artificial-intelligence process or (ii) a composition of an input dataset associated with the machine-learning or artificial-intelligence process.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 1C, 2, 3A, 3B, 4A, 4B, and 5 are block diagrams illustrating additional portions of the exemplary computing environment, in accordance with some exemplary embodiments.

FIG. 6 is a flowchart of an exemplary process for dynamically monitoring an existence, and a persistence, of temporal variations in an explainability of a trained, machine-learning or artificial-intelligence processes within a distributed computing environment, in accordance with some embodiments.

Like reference numbers and designations in the various drawings indicate like elements.

DETAILED DESCRIPTION

Figure 1A:
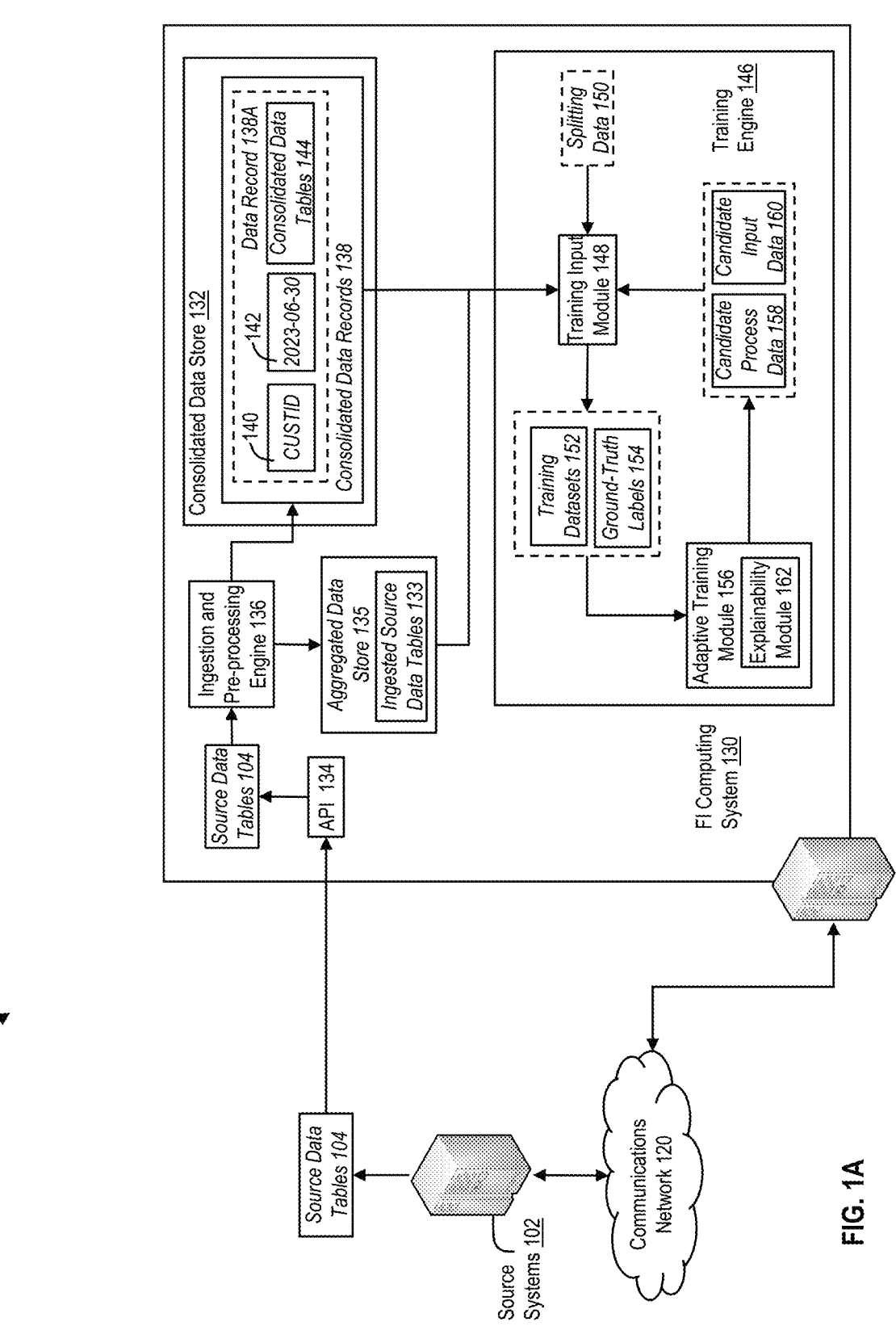
FIG. 1A is a block diagram illustrating portions of an exemplary computing environment, in accordance with some exemplary embodiments.

Today, many organizations, such as financial institutions, rely on a predictive output of machine-learning and artificial-intelligence processes to inform a variety of decisions and strategies. By way of example, a financial institution may obtain elements of customer-specific, predicted output generated through an application of one or more trained machine-learning or artificial-intelligence processes, and the obtained elements of predicted, customer-specific output may inform, among other things, customer-specific strategies for mitigating or managing risk, decisions related to a suspiciousness of certain activities performed by these existing and prospective customers, or collection strategies involving one or more existing customers of the financial institution. Further, in some examples, the financial institution may also rely on the elements of customer-specific predicted output to inform decisions associated with the provisioning of financial products or services to existing or prospective customers of the financial institution, decisions associated with a requested modification to a term of condition of a provisioned financial product or service, or decisions associated with a targeted marketing of products and services to existing and prospective customers.

The processes that train adaptively, and validate, a machine-learning or artificial-intelligence process may generate elements of explainability data, such as Shapley values, that characterize a relative contribution of each feature of an input dataset to a predictive output of the machine-learning or artificial-intelligence process. Further, the adaptive training and validation of the machine-learning or artificial-intelligence process may establish, among other things, a baseline ranking of the features of the trained machine-learning or artificial-intelligence process in accordance with the Shapley values, a baseline relationship between the relationship between a magnitude of corresponding ones of the feature values and a magnitude of the predictive output, and additionally, or alternatively, a baseline relationship between a magnitude of a corresponding feature value and magnitude of a corresponding ones of Shapley values. A stable, machine-learning or artificial-intelligence process may maintain these baseline relationships through multiple inferencing operations performed months, or years, subsequent to the initial training and validation date, and may continue to provide predictive output consistent with the one or more process validation protocols imposed by the financial institution, and consistent with an expectation of one or more business units that rely on the predictive output to inform customer-facing decisions.

In some instances, however, a trained, machine-learning or artificial-intelligence process may experience temporal variations, or "drifts," in these baseline relationships in the months, or years subsequent to the initial training and validation date. These temporal variations or drifts may, in some instances, results from subtle, time-evolving changes in a quality or a composition of source data ingested by the computing systems of the financial institution, which facilitate the generation of customer-specific input datasets during inferencing, or from subtle time-evolving changes in the behavior of the prospective or existing customers characterized by the source data. These subtle, time-evolving changes may not be captured during the initial adaptive training and validation of the machine-learning or artificial-intelligence process, and in many instances, these subtle, time-evolving changes result in significant temporal variations in the baseline relationships established at the initial training and validation date, which may result in a provisioning unreliable or inaccurate predictive output to the of one or more business units.

Although existing processes may monitor, and quantify, a performance of a trained, machine-learning or artificial intelligence process, and a distribution of predictive output, during deployment and subsequent to an initial training and validation, these processes are generally incapable of monitoring time-evolving changes in the baseline relationships that explain an operation of the machine-learning or artificial intelligence process or the generation of predictive output, much less determining whether such time-evolving changes in the baseline relationships are sufficiently significant during a corresponding monitoring interval, and/or sufficient persistent across prior monitoring intervals, to trigger a modification to an input stream of ingested source data, or to trigger an a further training and validation of the machine-learning or artificial intelligence process. Certain of these exemplary processes, which enable one or more computing systems to determine dynamically a temporal variation in an explainability of a trained, machine-learning or artificial intelligence process between an initial training and validation date and a corresponding, predetermined monitoring interval, and to programmatically modify a process parameter value of, or a composition of an input dataset associated with, the trained, machine-learning or artificial intelligence process in response to a determined significance of the temporal variation within the corresponding, predetermined monitoring interval and persistence of that determined significance across a threshold number of prior monitoring intervals that immediately precede the corresponding predetermined monitoring interval, may be implemented in additional to, or as an alternate to, existing processes for modelling and quantifying process performance or a distribution of predictive output.

A. Exemplary Techniques for Generating Explainability Data During Process Training, Validation, and Inferencing FIG. 1A illustrates components of an exemplary computing environment 100, in accordance with some exemplary embodiments. For example, as illustrated in FIG. 1A, computing environment 100 may include one or more source systems 102, and one or more computing systems associated with, or operated by, a financial institution, such as a financial institution (FI) computing system 130. In some instances, each of source systems 102 and FI computing system 130, may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some examples, each of source systems 102 and FI computing system 130 may represent a computing system that includes one or more servers and tangible, non-transitory memories storing executable code and application modules. Further, the one or more servers may each include one or more processors, which may be configured to execute portions of the stored code or application modules to perform operations consistent with the disclosed embodiments. For example, the one or more processors may include a central processing unit (CPU) capable of processing a single operation (e.g., a scalar operations) in a single clock cycle. Further, each of source systems 102 and FI computing system 130 may also include a communications interface, such as one or more wireless transceivers, coupled to the one or more processors for accommodating wired or wireless internet communication with other computing systems and devices operating within computing environment 100.

Further, in some instances, source systems 102 and FI computing system 130 may each be incorporated into a respective, discrete computing system. In additional, or alternate, instances, one or more of source systems 102 and FI computing system 130 may correspond to a distributed computing system having a plurality of interconnected, computing components distributed across an appropriate computing network, such as communications network 120 of FIG. 1A. For example, FI computing system 130 may correspond to a distributed or cloud-based computing cluster associated with and maintained by the financial institution, although in other examples, FI computing system 130 may correspond to a publicly accessible, distributed or cloud-based computing cluster, such as a computing cluster maintained by Microsoft Azure™, Amazon Web Services™, Google Cloud™, or another third-party provider.

In some instances, FI computing system 130 may include a plurality of interconnected, distributed computing components, such as those described herein (not illustrated in FIG. 1A), which may be configured to implement one or more parallelized, fault-tolerant distributed computing and analytical processes (e.g., an Apache Spark™ distributed, cluster-computing framework, a Databricks™ analytical platform, etc.). Further, and in addition to the CPUs described herein, the distributed computing components of FI computing system 130 may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Referring back to FIG. 1A, each of source systems 102 may maintain, within corresponding tangible, non-transitory memories, a data repository that includes confidential data associated with the customers of the financial institution. For example, one or more of source systems 102 may be associated with, or operated by, the financial institution, and may maintain, within one or more tangible, non-transitory memories, a source data repository that includes source data tables identifying or characterizing customers of the financial institution and interactions between these customers and the financial institution, such as, but are not limited to, data tables that maintain elements of customer profile data, account data, transaction data, and credit-bureau data that identify and characterize the customers of the financial institution and their relationships or interactions with the financial institution (or with unrelated financial institution or entities within the financial services industry).

Referring back to FIG. 1A, FI computing system 130 may perform operations that establish and maintain one or more centralized data repositories within corresponding ones of the tangible, non-transitory memories. For example, as illustrated in FIG. 1A, FI computing system 130 may establish a consolidated data store 132, which maintains, among other things, consolidated elements (e.g., data tables) of the customer-profile, account, transaction, delinquency, and credit-bureau data associated with one or more of the customers of the financial institution. In some instances, FI computing system 130 may perform any of the exemplary processes described herein to ingest source data tables that include customer-profile, account, transaction, delinquency, and credit-bureau data maintained at one or more of source systems 102 (e.g., in accordance with a predetermined schedule, or in real-time on a streaming basis, etc.), and to apply one or more pre-processing operations to the source data tables, and to generated corresponding, customer-specific, consolidated data tables that include elements of the pre-processed customer-profile, account, transaction, delinquency, and credit-bureau data. Consolidated data store 132 may, for instance, correspond to a data lake, a data warehouse, or another centralized repository established and maintained, respectively, by the distributed components of FI computing system 130, e.g., through a Hadoop™ distributed file system (HDFS).

For example, FI computing system 130 may execute one or more application programs, elements of code, or code modules that, in conjunction with the corresponding communications interface, establish a secure, programmatic channel of communication with each of source systems 102, and may perform operations that access and obtain all, or a selected portion, of the elements of customer profile, account, transaction, and/or credit-bureau data maintained by corresponding ones of source systems 102. As illustrated in FIG. 1A, each of source systems 102 may perform operations that obtain one or more of source data tables 104, including the data elements of customer-profile data, account data, transaction data, and credit-bureau data from corresponding data repositories, and that transmit corresponding ones of source data tables 104 across communications network 120 to FI computing system 130. In some instances, each of source systems 102 may perform operations that transmit respective ones of source data tables 104 across communications network 120 to FI computing system 130 in batch form and in accordance with a predetermined temporal schedule (e.g., on a daily basis, on a monthly basis, etc.), or in real-time on a continuous, streaming basis.

A programmatic interface established and maintained by FI computing system 130, such as application programming interface (API) 134, may receive the source data tables 104 (which may include elements of the customer-profile data, account data, transaction data, and credit-bureau data) from source systems 102, and API 134 may route source data tables 104 to a data ingestion and pre-processing engine 136 executed by the one or more processors of FI computing system 130. Executed ingestion and pre-processing engine 136 may also perform operations that store source data tables 104 (including the elements of customer-profile data, account data, transaction data, transaction data, and credit-bureau data) within a portion of the one or more tangible, non-transitory memories of FI computing system 130, e.g., as ingested source data tables 133 of aggregated data store 135.

In some instances, executed ingestion and pre-processing engine 136 perform any of the exemplary data pre-processing operations described herein to selectively aggregate, filter, process, and/or transform subsets of source data tables 104, and to generate consolidated data records 138 that characterize corresponding ones of the customers, their interactions with the financial institution and with other financial institutions, and their use (or misuse) of financial products provisioned by the financial institution or by other unrelated financial institutions or entities within the financial services industry, during a corresponding temporal interval associated with the ingestion of source data tables 104 from one or more of source systems 102. Executed ingestion and pre-processing engine 136 may perform operations that store each of consolidated data records 138 within the one or more tangible, non-transitory memories of FI computing system 130, such as within consolidated data store 132. Consolidated data store 132 may, for instance, correspond to a data lake, a data warehouse, or another centralized repository established and maintained, respectively, by the distributed components of FI computing system 130, e.g., through a Hadoop™ distributed file system (HDFS).

In some instances, and as described herein, consolidated data records 138 may include a plurality of discrete data records, and each of these discrete data records may be associated with, and may maintain data characterizing, a corresponding one of the customers of the financial institution during the corresponding temporal interval (e.g., a month-long interval extending from Jun. 1, 2023, to Jun. 20, 2023). For example, and for a particular customer of the financial institution, discrete data record 138A of consolidated data records 138 may include a customer identifier 140 of the particular customer (e.g., an alphanumeric character string "CUSTID"), a temporal identifier 142 of the corresponding temporal interval (e.g., a numerical string "2023-06-30"), and consolidated data tables 144 that include elements of customer-profile, account, transaction, and credit-bureau data that characterize the particular customer during the corresponding temporal interval (e.g., as consolidated from corresponding ones of source data tables 104 ingested by FI computing system 130 on Jun. 30, 2023.

In some instances, FI computing system 130 may perform operations that train adaptively a machine-learning or artificial-intelligence process to predict a likelihood of an occurrence of a target event involving a corresponding customer of the financial institution during a target temporal interval using training datasets associated with a first prior temporal interval (e.g., a "training" interval), and using validation datasets associated with a second, and distinct, prior temporal interval (e.g., an out-of-time "validation" interval). By way of example, the target event may include, but are not limited to, an a default or a delinquency involving an unsecured lending product, such as a credit-card account or an unsecured personal loan, or an occurrence of a default or delinquency event involving a secured lending product, such as a home mortgage, a home-equity line-of-credit, or an auto loan, and the target temporal interval may include, among other things, a future, one-month interval, a future, six-month interval, or a future, twelve-month interval. Further, a predictive output of the trained, machine-learning or artificial-intelligence process may, in some examples, inform a decision of the financial institution to pre-approve, or approve, an issuance of a corresponding one of the secured or unsecured lending products to a customer (e.g., in response to an application, etc.), or to modify a term or condition of a previously issued secured or unsecured lending product (e.g., a credit limit associated with a credit-card account, etc.). The disclosed embodiments are, however, not limited to these exemplary occurrences of targeted events, and in other instances, FI computing system 130 may perform operations that train adaptively a machine-learning or artificial-intelligence process to predict a likelihood of an occurrence of any additional, or alternate, event appropriate to the consolidated elements of customer-profile, account, transaction, or credit-bureau data maintained within consolidated data records 138, and appropriate to the machine-learning or artificial-intelligence process.

Further, and as described herein, the machine-learning or artificial-intelligence process may include an ensemble or decision-tree process, such as a gradient-boosted decision-tree process (e.g., the XGBoost process), and the training and validation datasets may include, but are not limited to, values of adaptively selected features obtained, extracted, or derived from the consolidated data records maintained within consolidated data store 132, e.g., from data elements maintained within the discrete data records of consolidated data records 138. By way of example, the values of adaptively selected features of the training and validation datasets may be obtained, extracted, or derived from the consolidated, customer-specific elements of customer profile data, account data, transaction data, and credit-bureau data that characterize the customers of the financial institution during respective ones of the training and validation intervals, e.g., as maintained within the consolidated data records of consolidated data store 132. In some instances, and through a performance of one or more of the adaptive process training and validation operations described herein, FI computing system 130 may generate elements of process parameter data, which includes value of one or more process parameters for the trained, machine-learning or artificial-intelligence process, and elements of composition data, which identify each of feature of an input dataset for the trained, machine-learning or artificial-intelligence process and specify a sequential position of each feature within the input dataset.

Further, and through the performance of one or more of the adaptive process training and validation operations described herein, FI computing system 130 may generate elements of explainability data that, among other things, characterize a relationship between a value of each, or a subset of, the features within the input dataset and the predictive output of the trained, machine-learning or artificial-intelligence process. In some instances, the elements of explainability data may include a Shapley value associated with each of the features of the input dataset, and as described herein, the Shapley values may characterize a relative importance of each of the discrete features within the input dataset (e.g., as specified within the composition data), and further, a relationship between a magnitude of corresponding ones of the feature values and a magnitude of the predictive output.

By way of example, and for a particular input feature, a Shapley value of large magnitude may imply that a value of the particular input feature is associated with a corresponding, large contribution to the predicted output, and an increase in a magnitude of that particular feature value may drive an increase a magnitude of that predicted output. Further, for a particular input feature, a Shapley value of small magnitude may imply that a value of the particular input feature is associated with a corresponding, small contribution to the predicted output and to any increase in the magnitude of that predicted output. In some instances, the elements of explainability data generated through the adaptive training of the machine-learning or artificial intelligence process may represent elements of reference explainability data that characterize, among other things, a baseline relationship between the values of the features within the input dataset and the predictive output of the machine-learning or artificial intelligence, and further, the reference explainability data may facilitate an application of one or more of the exemplary, dynamic explainability monitoring processes during one or more temporal intervals subsequent to the adaptive training of the machine-learning or artificial intelligence process, e.g., during a deployment of the trained machine-learning or artificial intelligence process.

Referring back to FIG. 1A, a training engine 146 executed by the one or more processors of FI computing system 130 may access the consolidated data records maintained within consolidated data store 132, such as, but not limited to, the discrete data records of consolidated data records 138. As described herein, each of the consolidated data records, such as discrete data record 138A of consolidated data records 138, may include a customer identifier of a corresponding one of the customers of the financial institution (e.g., customer identifier 140) and a temporal identifier that associates the consolidated data record with a corresponding temporal interval (e.g., temporal identifier 142). Each of the accessed consolidated data records may also include consolidated data tables of customer-profile, account, transaction, and credit-bureau data that characterize the corresponding one of the customers during the corresponding temporal interval (e.g., consolidated data tables 144).

Figure 1B:
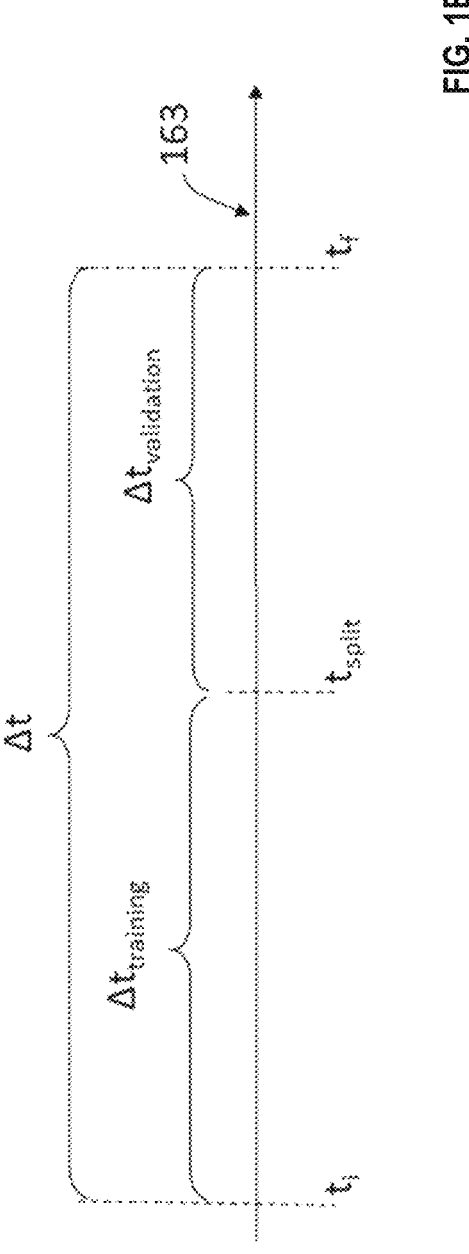
FIG. 1B is a diagram of an exemplary timeline for training a machine-learning or artificial intelligence process, in accordance with some exemplary embodiments.

In some instances, the consolidated data records 138 of consolidated data store 132 may characterize corresponding ones of the customers cross a range of prior temporal intervals, and executed training engine 146 may also perform operations that decompose the range of prior temporal intervals into a corresponding first subset of the prior temporal intervals (e.g., the "training" interval described herein) and into a corresponding second, subsequent, and disjoint subset of the prior temporal intervals (e.g., the "validation" interval described herein). For example, as illustrated in FIG. 1B, the range of prior temporal intervals (e.g., shown generally as $\Delta t$ along timeline 163 of FIG. 1B) may be bounded by, and established by, temporal boundaries $t_i$ and $t_f$. Further, the decomposed first subset of the prior temporal intervals (e.g., shown generally as training interval $\Delta t_{training}$ along timeline 163 of FIG. 1B) may be bounded by temporal boundary $t_i$ and a corresponding splitting point $t_{split}$, and the decomposed second subset of the prior temporal intervals (e.g., shown generally as validation interval $\Delta t_{validation}$ along timeline 163 of FIG. 1C) may be bounded by splitting point $t_{split}$ and temporal boundary $t_f$.

Referring back to FIG. 1A, executed training engine 146 may generate elements of splitting data 150 that identify and characterize the determined temporal boundaries of the consolidated data records maintained within consolidated data store 132 (e.g., temporal boundaries $t_i$ and $t_f$) and the range of prior temporal intervals established by the determined temporal boundaries Further, the elements of splitting data 150 may also identify and characterize the splitting point (e.g., the splitting point $t_{split}$ described herein), the first subset of the prior temporal intervals (e.g., the training interval $\Delta t_{training}$ and corresponding boundaries described herein), and the second, and subsequent subset of the prior temporal intervals (e.g., the validation interval $\Delta t_{validation}$ and corresponding boundaries described herein).

In some examples, a training input module 148 of executed training engine 146 may perform operations that access consolidated data records 138 maintained within consolidated data store 132. Based on portions of splitting data 150, executed training input module 148 may perform operations, described herein, that parse consolidated data records 138 and determine: (i) a first subset of consolidated data records 138 that are associated with the training interval $\Delta t_{training}$ and may be appropriate to training adaptively the machine-learning or artificial-intelligence process during the training interval; and a (ii) second subset of consolidated data records 138 are associated with the validation interval $\Delta t_{validation}$ and may be appropriate to validating the trained, machine-learning or artificial-intelligence process during the validation interval.

For instance, executed training input module 148 may access consolidated data records 138 maintained within consolidated data store 132, and parse each of the consolidated data records to obtain a corresponding customer identifier (e.g., which associates with the consolidated data record with a corresponding one of the customers of the financial institution) and a corresponding temporal identifier (e.g., which associated the consolidated data record with a corresponding temporal interval). For example, and based on the obtained customer and temporal identifiers, executed training input module 148 may obtain customer-specific groups of consolidated data records 138 associated with corresponding ones of the customer identifiers (e.g., customer-specific sets of discrete data records), and within each of the customer-specific groups, executed training input module 148 may order the discrete data records in accordance with the obtained temporal interval. Through these exemplary processes, executed training input module 148 may generate customer-specific groups of sequentially ordered data records, including corresponding, customer-specific consolidated data tables, which executed training input module 148 may maintain locally within the consolidated data store 132 (not illustrated in FIG. 1B).

Executed training input module 148 may also perform operations that partition the customer-specific groups of sequentially ordered data records into the subsets suitable for training the machine-learning or artificial-intelligence process and for validating the machine-learning or artificial-intelligence process. By way of example, executed training input module 148 may access splitting data 150, which establishes the temporal boundaries for the training interval $\Delta t_{training}$ (e.g., temporal boundary $t_i$ and splitting point $t_{split}$) and the validation interval $\Delta t_{training}$ (e.g., splitting point $t_{split}$ and temporal boundary $t_f$). Further, executed training input module 148 may also parse each of the sequentially ordered data records of the customer-specific groups, access the corresponding temporal identifier, and determine the temporal interval associated with the each of sequentially ordered data records within corresponding ones of the customer-specific groups.

If, for example, executed training input module 148 were to determine that the temporal interval associated with a corresponding one of the sequentially ordered data records is disposed within the temporal boundaries for the training interval $\Delta t_{training}$, executed training input module 148 may determine that the corresponding data record may be suitable for training, and may perform operations that include the corresponding data record within a portion of the first subset (e.g., that store the corresponding data record within a portion of consolidated data store 132 associated with the first subset (not illustrated in FIG. 1)). Alternatively, if executed training input module 148 were to determine that the temporal interval associated with a corresponding one of the sequentially ordered data records is disposed within the temporal boundaries for the validation interval $\Delta t_{validation}$, executed training input module 148 may determine that the corresponding data record may be suitable for validation, and may perform operations that include the corresponding data record within a portion of the second subset (e.g., that store the corresponding data record within a portion of consolidated data store 132 associated with the second subset (not illustrated in FIG. 1A)). Executed training input module 148 may perform any of the exemplary processes described herein to determine the suitability of each additional, or alternate, one of the sequentially ordered data records of the customer-specific groups for training, or alternatively, validation, of the machine-learning or artificial-intelligence process.

Executed training input module 148 may perform operations that generate a plurality of training datasets 152 based on elements of obtained, extracted, or derived from all or a selected portion of the first subset of the consolidated data records 138 (e.g., that are suitable to training adaptively the machine-learning or artificial-intelligence process), and additionally, or alternatively, based on elements of ingested customer profile, account, transaction, or credit-bureau data maintained within the one or more tangible, non-transitory memories of FI computing system 130 (e.g., portions of ingested source data tables 133 of aggregated data store 135). In some instances, described herein, the plurality of training datasets 152 may, when provisioned to an input layer of the gradient-boosted decision-tree process described herein, enable executed training engine 146 to train the gradient-boosted decision-tree process to predict likelihood of an occurrence of a target event, involving customers of the financial institution during a target temporal interval.

As described herein, each of training datasets 152 may be associated with a corresponding one of the customers of the financial institution and a corresponding temporal interval, and may include, among other things a customer identifier associated with that corresponding customer and a temporal identifier representative of the corresponding temporal interval, as described herein. Each of the plurality of training datasets 152 may also include elements of data (e.g., feature values) that characterize the corresponding one of the customers, the corresponding customer's interaction with the financial institution or with the other, unrelated financial institutions or entities in the financial services industry, and in some instances, data characterizing the target event (e.g., data characterizing an application for a secured or unsecured lending product, etc.).

In some instances, the plurality of training datasets 152 may include a value of one or more numerical input features, and additionally or alternatively, a value one or more categorical input features, and examples of the categorical input features. Further, and by way of example, executed training input module 148 may perform operations that identify, and obtain or extract, one or more of the features values for each of training datasets 152 from a corresponding one of consolidated data records maintained within the first subset, and additionally, or alternatively, from elements of ingested source data tables 133, that include, or reference, the corresponding customer identifier and that characterize the corresponding customer. Executed training input module 148 may also perform operations that compute, determine, or derive one or more of the features values based on elements of data extracted or obtained from a corresponding one of consolidated data records maintained within the first subset, and additionally, or alternatively, from elements of ingested source data tables 133, that include, or reference, the corresponding customer identifier.

In some instances, each of training datasets 152 may also be associated with a corresponding one of ground-truth labels 154, which may indicate an occurrence, or alternatively, a non-occurrence, of the target event within the target temporal interval, that includes, or is subsequent to, the temporal interval associated with the corresponding temporal identifier. By way of example, and for a particular one of training datasets 152, executed training input module 148 may obtain a corresponding customer identifier and a corresponding temporal identifier (e.g., that identifies the temporal interval associated with each of training datasets 152). Further, and based on the corresponding customer identifier and temporal identifier, executed training input module 148 may access one or more of consolidated data records 138, and/or one of more of the elements of ingested source data tables 133, that include, or reference, the corresponding customer identifier, and determine the occurrence, or non-occurrence, of the target event within the target temporal interval, that includes, or is subsequent to, the temporal interval associated with the corresponding temporal identifier.

If executed training input module 148 were to determine the occurrence of the target event during the target temporal interval, executed training input module 148 may generate a corresponding one of ground-truth labels 154 that associates the particular one of training datasets 152 with a positive label. Alternatively, if executed training input module 148 were to determine the occurrence of the target event during the target temporal interval, executed training input module 148 may generate an additional one of ground-truth labels 154 that associates the particular one of training datasets 152 with a negative label. Executed training input module 148 may also perform any of the exemplary labelling processes described herein to generate a corresponding one of ground-truth labels 154 for each additional, or alternate, one of training datasets 152.

Executed training input module 148 may provide training datasets 152 and corresponding ground-truth labels 154 as inputs to an adaptive training module 156 of executed training engine 146, which may perform any of the exemplary processes described herein to train adaptively the machine-learning or artificial-intelligence process based on training datasets 152 and in accordance with ground-truth labels 154, and to generate elements of candidate process parameters 158 and candidate composition data 160. For example, the machine-learning or artificial-intelligence process may include a gradient-boosted, decision-tree process (e.g., an XGBoost process), and upon execution by the one or more processors of FI computing system 130, adaptive training module 156 may perform operations that establish a plurality of nodes and a plurality of decision trees for the gradient-boosted, decision-tree process (i.e., in accordance with an initial set of process parameters), which may ingest and process the elements of training data (e.g., the customer identifiers, the temporal identifiers, the feature values, etc.) maintained within each of the plurality of initial training datasets 152.

Further, and based on the execution of adaptive training module 156, and on the ingestion of each of initial training datasets 152 by the established nodes of the gradient-boosted, decision-tree process, FI computing system 130 may perform operations that adaptively train the gradient-boosted, decision-tree process against the elements of training data included within each of initial training datasets 152 and corresponding ground-truth labels 154. In some examples, during the adaptive training of the gradient-boosted, decision-tree process, an explainability module 162 of executed adaptive training module 156 may perform operations that characterize a relative of importance of discrete features within one or more of training datasets 152 through a generation of corresponding Shapley values and/or through a generation of values of probabilistic metrics that average a computed area under curve for receiver operating characteristic (ROC) curves.

In some instances, the distributed components of FI computing system 130 may execute adaptive training module 156, and may perform any of the exemplary processes described herein in parallel to train adaptively the gradient-boosted, decision-tree process against the elements of training data included within each of training datasets 152. The parallel implementation of adaptive training module 156 by the distributed components of FI computing system 130 may, in some instances, be based on an implementation, across the distributed components, of one or more of the parallelized, fault-tolerant distributed computing and analytical protocols described herein (e.g., the Apache Spark™ distributed, cluster-computing framework).

Through the performance of these adaptive training processes, executed adaptive training module 156 may perform operations that iteratively add, subtract, or combine discrete features from training datasets 152 based on the corresponding Shapley values or one or more of the Shapley values or the generated values of the probabilistic metrics, and that generate one or more intermediate training datasets reflecting the iterative addition, subtraction, or combination of discrete features from corresponding ones of training datasets 152, and in some instances, an intermediate set of process parameters for the gradient-boosted, decision-tree process (e.g., to correct errors, etc.). Executed adaptive training module 156 may also perform operations that re-establish the plurality of nodes and the plurality of decision trees for the gradient-boosted, decision-tree process (i.e., in accordance with the intermediate set of process parameters), which may ingest and process the elements of training data maintained within each of the intermediate training datasets. Based on the execution of adaptive training module 156, and on the ingestion of each of the intermediate training datasets by the re-established nodes of the gradient-boosted, decision-tree process, FI computing system 130 may perform operations that adaptively train the gradient-boosted, decision-tree process against the elements of training data included within each of intermediate training datasets and corresponding elements of ground-truth labels and further, that generate additional Shapley values and additional values of probabilistic metrics (as described herein) that characterize a relative of importance of discrete features within one or more of intermediate training datasets.

In some instances, executed adaptive training module 156 may implement iteratively one or more of the exemplary adaptive training processes described herein, which iteratively add, subtract, or combine discrete features from corresponding ones of intermediate training datasets based on the corresponding Shapley values or one or more of the generated values of the probabilistic metrics, until a marginal impact resulting from a further addition, subtraction, or combination of discrete features values on a predictive output of the gradient-boosted, decision-tree process falls below a predetermined threshold (e.g., the addition, subtraction, or combination of the discrete features values within an updated intermediate training dataset results in a change in a value of one or more of the probabilistic metrics that falls below a predetermined threshold change, etc.). Based on the determination that the marginal impact resulting from the further addition, subtraction, or combination of discrete features values on the predictive output falls below the predetermined threshold, executed adaptive training module 156 may deem complete the training of the gradient-boosted, decision-tree process against the in-time and in-sample training datasets 152 and may perform operations that compute one or more candidate process parameters that characterize the adaptively trained, gradient-boosted, decision-tree process, and package the candidate process parameters into corresponding portions of candidate process parameters 158.

In some instances, candidate process parameters 158 may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyper-parameters that reduce potential model overfitting (e.g., regularization of pseudo-regularization hyperparameters). Further, and based on the performance of these adaptive training processes, executed adaptive training module 156 may also generate candidate composition data 160, which specifies a composition of an input dataset for the adaptively trained, gradient-boosted, decision-tree process (e.g., which be provisioned as inputs to the nodes of the decision trees of the adaptively trained, gradient-boosted, decision-tree process).

Figure 1C:
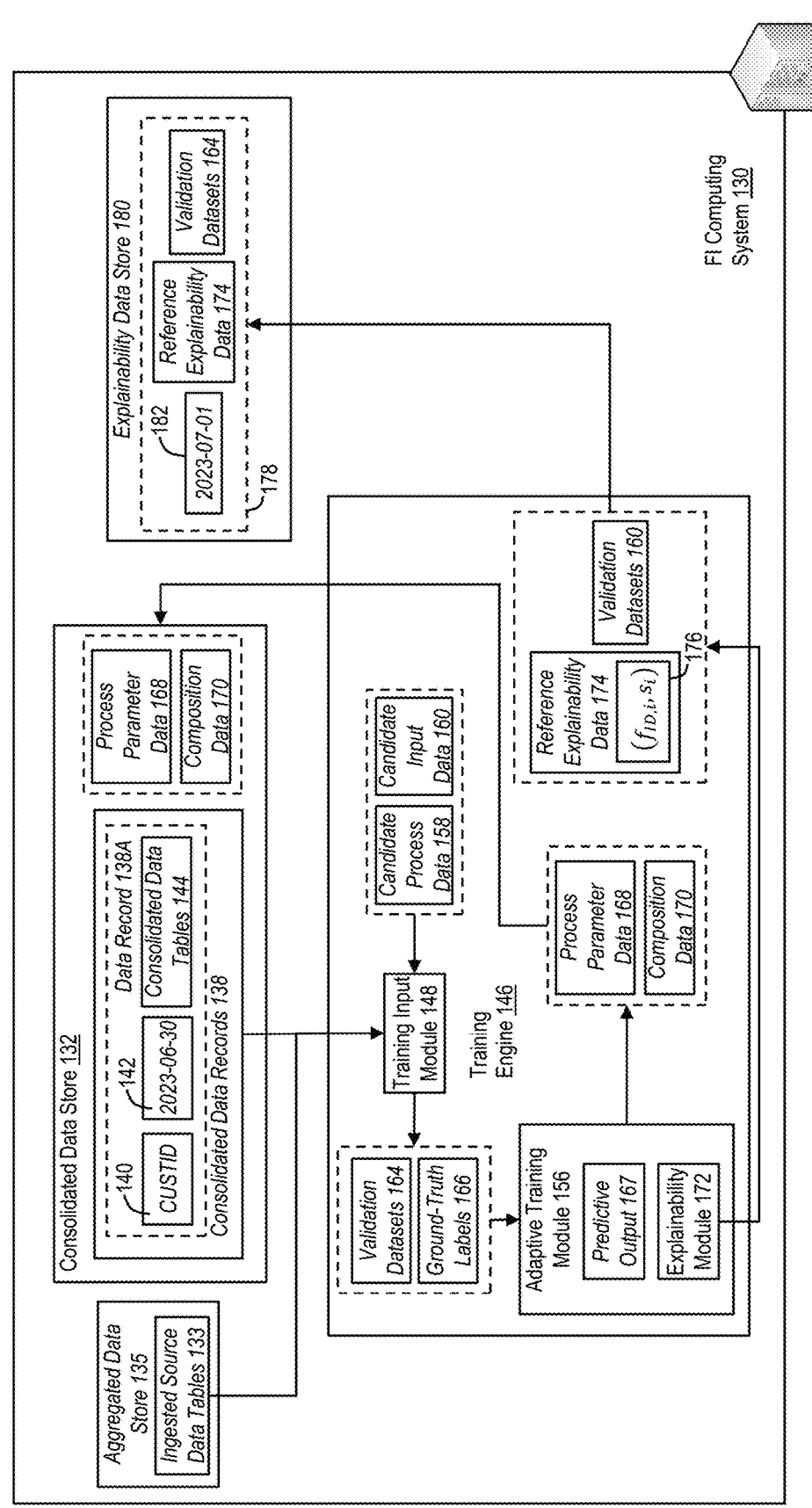

Executed adaptive training module 156 may provide candidate process parameters 158 and candidate composition data 160 as inputs to executed training input module 148 of training engine 146, which, in conjunction with executed adaptive training module 156, may perform operations that validate the trained, machine-learning or artificial-intelligence process against elements of data maintained within the second subset of consolidated data records 138 deemed suitable for the validation of the machine-learning or artificial-intelligence process. Referring to FIG. 1C, executed training input module 148 may receive candidate composition data 160, and may perform any of the exemplary processes described herein to generate a plurality of validation datasets 164 based on corresponding ones of consolidated data records 138 maintained within the second subset, and additionally, or alternatively, from elements of ingested source data tables 133, that characterize corresponding ones of the customers.

Further, each of validation datasets 164, may also be associated with a corresponding one of ground-truth labels 166, which may indicate an occurrence, or alternatively, a non-occurrence, of the target event within a temporal period, e.g., the target temporal interval, that includes, or is subsequent to, the temporal interval associated with the corresponding one of validation datasets 164 (e.g., as specified by a corresponding temporal identifier), and executed training input module 148 may perform any of the exemplary processes described herein generate ground-truth labels 166 based on one or more of consolidated data records 138, and additionally, or alternatively, one of more of the elements of ingested source data tables 133.

Executed training input module 148 may provide validation datasets 164 and corresponding ground-truth labels 166 as inputs to executed adaptive training module 156, which may perform any of the exemplary processes described herein to validate a predictive capability and accuracy of the adaptively trained, machine-learning or artificial-intelligence process, for example, based on ground-truth labels 166 associated with corresponding ones of the validation datasets 164, and based on one or more computed metrics, such as, but not limited to, computed precision values, computed recall values, computed areas under curve (AUCs) for receiver operating characteristic (ROC) curves or precision-recall (PR) curves, and/or computed multiclass, one-versus-all areas under curve (MAUCs) for ROC curves.

For example, the machine-learning or artificial-intelligence process may include a gradient-boosted, decision-tree process (e.g., an XGBoost process), and executed adaptive training module 156 may obtain candidate process parameters 158, and may perform operations that establish the plurality of nodes and the plurality of decision trees for the gradient-boosted, decision-tree process in accordance with each, or a subset, of candidate process parameters 158. As described herein, candidate process parameters 158 for the adaptively trained gradient-boosted, decision-tree process may include, but are not limited to, a learning rate, a number of discrete decision trees (e.g., the "n_estimator" for the adaptively trained, gradient-boosted, decision-tree process), a tree depth characterizing a depth of each of the discrete decision trees, a minimum number of observations in terminal nodes of the decision trees, and/or values of one or more hyperparameters that reduce potential model overfitting (e.g., regularization of pseudo-regularization hyperparameters).

Executed adaptive training module 156 may perform any of the exemplary processes described herein to apply the adaptively trained, gradient-boosted, decision-tree process to the elements of data maintained within respective ones of validation datasets 164, e.g., based on an ingestion and processing of the data maintained within respective ones of validation datasets 164 by the established nodes and decision trees of the adaptively trained, gradient-boosted, decision-tree process. Further, executed adaptive training module 156 may also perform operations that generate elements of predictive output 167 through the application of the adaptively trained, gradient-boosted, decision-tree process to a corresponding one of validation datasets 164 and as described herein, each elements of predictive output 167 may indicate the predicted likelihood of target event involving the corresponding customer during the target temporal interval.

Executed adaptive training module 156 may also perform operations that compute a value of one or more metrics that characterize a predictive capability, and an accuracy, of the adaptively trained, machine-learning or artificial-intelligence process (e.g., the adaptively trained, gradient-boosted, decision-tree process described herein) based on the generated elements of predictive output 167, corresponding ones of validation datasets 164, and corresponding ones of ground-truth labels 166. The computed metrics may include, but are not limited to, one or more recall-based values for the adaptively trained, gradient-boosted, decision-tree process (e.g., "recall@5," "recall@10," "recall@20," etc.), and additionally, or alternatively, one or more precision-based values for the adaptively trained, gradient-boosted, decision-tree process. Further, in some examples, the computed metrics may include a computed value of an area under curve (AUC) for a precision-recall (PR) curve associated with the adaptively trained, gradient-boosted, decision-tree process, a computed value of an AUC for a receiver operating characteristic (ROC) curve associated with the adaptively trained, gradient-boosted, decision-tree process, and additionally, or alternatively, a computed value of multi-class, one-versus-all area under curve (MAUC) for a ROC. The disclosed embodiments are, however, not limited to these exemplary computed metric values, and in other instances, executed adaptive training module 156 may compute a value of any additional, or alternate, metric appropriate to validation datasets 164, the ground-truth labels, or the adaptively trained, machine-learning or artificial-intelligence process.

In some examples, executed adaptive training module 156 may perform operations that determine whether all, or a selected portion of, the computed metric values satisfy one or more threshold conditions for a deployment of the adaptively trained, machine-learning or artificial-intelligence process (e.g., the adaptively trained, gradient-boosted, decision-tree process described herein) and a real-time application to elements of application, customer profile, account, transaction, and/or credit-bureau data, as described herein. For instance, the one or more threshold conditions may specify one or more predetermined threshold values for the adaptively trained, gradient-boosted, decision-tree mode, such as, but not limited to, a predetermined threshold value for the computed recall-based values, a predetermined threshold value for the computed precision-based values, and/or a predetermined threshold value for the computed AUC values and/or MAUC values. In some examples, executed adaptive training module 156 that establish whether one, or more, of the computed recall-based values, the computed precision-based values, or the computed AUC or MAUC values exceed, or fall below, a corresponding one of the predetermined threshold values and as such, whether the adaptively trained, machine-learning or artificial-intelligence process satisfies the one or more threshold requirements for deployment.

If, for example, executed adaptive training module 156 were to establish that one, or more, of the computed metric values fail to satisfy at least one of the threshold requirements, FI computing system 130 may establish that the adaptively trained, machine-learning or artificial-intelligence process is insufficiently accurate for deployment and a real-time application to the elements of customer profile, account, transaction, credit-bureau, and/or application data described herein. Executed adaptive training module 156 may perform operations (not illustrated in FIG. 1C) that transmit data indicative of the established inaccuracy to executed training input module 148, which may perform any of the exemplary processes described herein to generate one or more additional training datasets and corresponding ground-truth labels, which may be provisioned to executed adaptive training module 156. In some instances, executed adaptive training module 156 may receive the additional training datasets and corresponding ground-truth labels, and may perform any of the exemplary processes described herein to train further the machine-learning or artificial-intelligence process against the elements of training data included within each of the additional training datasets.

Alternatively, if executed adaptive training module 156 were to establish that each computed metric value satisfies threshold requirements, FI computing system 130 may validate the adaptive training of the machine-learning or artificial-intelligence process (e.g., the gradient-boosted, decision-tree process described herein), and deem the adaptively trained, and now-validated, machine-learning or artificial-intelligence process ready for deployment and real-time application to the elements of customer profile, account, transaction, and credit-bureau data described herein. Executed adaptive training module 156 may generate process parameter data 168 that includes a value of the one or more process parameters of the machine-learning or artificial-intelligence process, such as, but not limited to, each of the process parameters specified within candidate process parameters 158. Further, executed adaptive training module 156 may also generate composition data 170, which characterizes a composition of an input dataset for the adaptively trained, and now validated, machine-learning or artificial-intelligence process and identifies each of the discrete feature values within the input dataset, along with a sequence or position of these feature values within the input dataset. As illustrated in FIG. 1A, executed adaptive training module 156 may perform operations that store process parameter data 168 and composition data 170 within the one or more tangible, non-transitory memories of FI computing system 130, such as consolidated data store 132.

In some instances, and based on validation datasets 164 and on the elements of predictive output 167 associated with corresponding one of validation datasets 164, an explainability module 172 of executed adaptive training module 156 may perform any of the exemplary processes described herein, in conjunction with executed adaptive training module 156 to generate one or more elements of reference explainability data 174, that characterize, among other things, a marginal effect of a perturbation in a value of each of the input features specified within process parameter data 168 on an outcome of the trained, machine-learning or artificial-intelligence process (e.g., the trained, gradient-boosted, decision-tree process) and a contribution of each of the features to the predictive output generated by an application of the trained, machine-learning or artificial-intelligence process to customer-specific input datasets. By way of example, executed explainability module 172 may compute reference Shapley values in accordance with a Shapley Additive exPlanations (SHAP) process (e.g., when the selected machine learning or artificial intelligence process corresponds to a gradient-boosted decision tree algorithm), or in accordance with an integrated gradient algorithm (e.g., when the selected machine learning or artificial intelligence process corresponds to a deep neural-network process, etc.).

Executed explainability module 172 may, for example, associated each of the computed reference Shapley values (e.g., $s_i$) with an identifier (e.g., $f_{ID,i}$) of the corresponding feature (e.g., one of the exemplary feature identifiers maintained within composition data 170), and may associated pairs 176 of feature identifiers and reference Shapley values (e.g., $(f_{ID,i}, s_i)$) into a corresponding portion of reference explainability data 174. In some instances, not illustrated in FIG. 1B, executed explainability module 172 may also perform operations that rank each of the associated pairs feature identifiers and reference Shapley values based on corresponding ones of reference Shapley values (e.g., in descending order), and package the ranked pairs of feature identifiers and reference Shapley values into corresponding portions of reference explainability data 174.

As illustrated in FIG. 1C, executed explainability module 172 may perform operations that store the elements of reference explainability data 174, which include associated pairs 176 of feature identifiers consistent with composition data 170 and reference Shapley values, and one or more of validation datasets 164 (which include values of the features specified within composition data 170) within a portion of the one or more tangible, non-transitory memories of FI computing system 130, e.g., within reference data record 178 of explainability data store 180. Executed explainability module 172 may also package one or more elements of initial training and validation date 182, which specifies a date on which FI computing system adaptively trained and validated the machine-learning or artificial-intelligence process (e.g., Jul. 1, 2023), into a corresponding portion of reference data record 178.

As described herein, the elements of reference explainability data 174 may characterize, among other things, a baseline relationship between the values of the features within composition data 170 and the predictive output of the trained, and validated, machine-learning or artificial intelligence process. Further, the elements of reference explainability data 174 may facilitate an application of one or more of the exemplary, dynamic explainability monitoring processes during one or more temporal intervals subsequent to the adaptive training of the machine-learning or artificial intelligence process, e.g., during a deployment of the trained machine-learning or artificial intelligence process in accordance with process parameter data 168, and an application of the trained machine-learning or artificial process to customer-specific input datasets consistent with composition data 170, in response to real-time of batch-based inferencing requests.

By way of example, subsequent to the adaptive training of the machine-learning or artificial intelligence process, and during the deployment of the trained machine-learning or artificial intelligence process, the distributed components of FI computing system 130 may receive, from a computing system or device operable by a business unit of the financial institution, a request (e.g., an inferencing request) to apply the trained, machine-learning or artificial-intelligence process to elements of data characterizing customers of the financial institution, and to provision, to the computing system or device, elements of predictive output indicating of a predicted likelihood of an occurrence of target event involving corresponding ones of the customers during a target temporal interval. By way of example, and as described herein, the target event may include, but are not limited to, an occurrence of a default or a delinquency involving an unsecured lending product, such as a credit-card account or an unsecured personal loan, or involving a secured lending product, such as a home mortgage, a home-equity line-of-credit, or an auto loan, and the elements of predictive output may inform a decision, by the computing system or device, to pre-approve (or approve) an application for the secured or unsecured lending product by corresponding ones of the customers.

Figure 2:
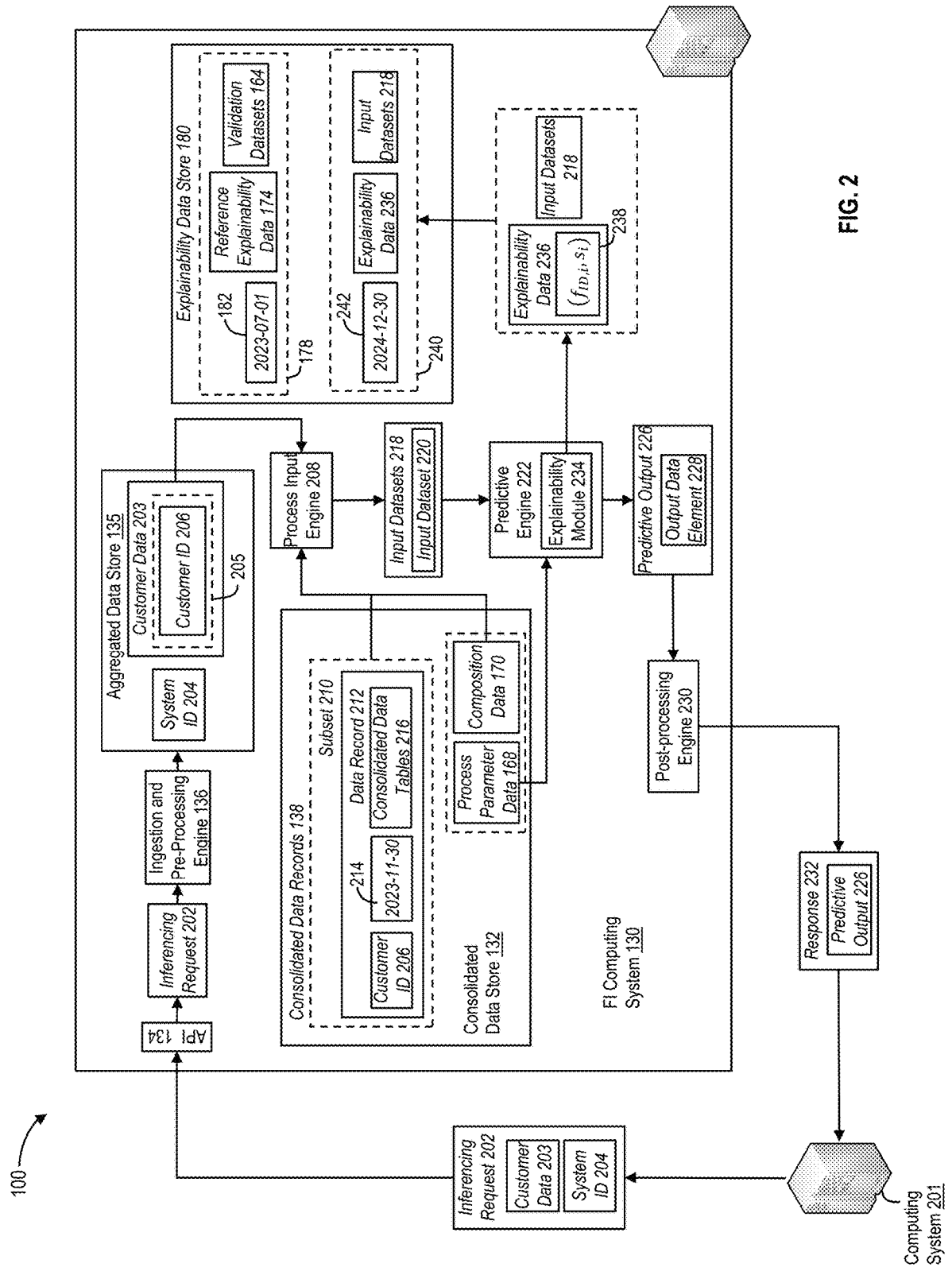

Referring to FIG. 2, one or more application programs executed by computing system or device operable by a business unit of the financial institution, such as a computing system 201, may generate an inferencing request 202 that include elements of customer data 203 and one or more system identifiers 204, such as but not limited to, an Internet Protocol (IP) address of a media access control (MAC) address assigned to computing system 201. The elements of customer data 203 may identify, and in some instances, characterize one or more customers of the financial institution and may include, among other things, a unique, alphanumeric customer identifier assigned to each of the one or more customers by the financial institution. Further, upon receipt by the distributed components of FI computing system 130, the inferencing request may cause FI computing system 130 to perform any of the exemplary processes described herein to generate, for each of the customers, an input dataset having a composition (e.g., sequential feature values) consistent with composition data 170, to apply the trained machine-learning or artificial intelligence process to each of the input data in accordance with the elements of process parameter data, and to generate elements of predictive output that characterizes a predictive likelihood of occurrence of a target event involving each of the one or more customers during the target temporal interval.

In some instances, upon receipt by the distributed components of FI computing system 130, the inferencing request may also cause FI computing system 130 to perform any of the exemplary processes described herein to generate, for each of the customer-specified input datasets, additional elements of explainability that include, but not limited to, a Shapley values associated with each of the features of the corresponding input dataset. As described herein, the Shapley values may characterize a relative importance of each of the discrete features within the input dataset (e.g., as specified within the composition data) and additionally, or alternatively, and a relationship between a magnitude of corresponding ones of the feature values and a magnitude of the predictive output. Further, and based on the additional elements of explainability data, and on the elements of reference explainability data 174 maintained within explainability data store 180 of FIG. 1B, FI computing system 130 may perform one or more of the dynamic explainability monitoring processes described herein, which may establish a temporal evolution, or "drift," in the relative importance of the discrete features within the input dataset, or in the relationship between a magnitude of corresponding ones of the feature values and a magnitude of the predictive output, across one or more temporal intervals subsequent to the adaptive training of that machine-learning or artificial intelligence process. As illustrated in FIG. 2, computing system 201 may transmit inferencing request 202, including the elements of customer data 203 and one or more system identifiers 204, across communications network 120 to FI computing system 130.

In some instances, computing system 201 may include one or more servers and tangible, non-transitory memories storing executable code and application modules. Further, the one or more servers may each include one or more processors (such as a central processing unit (CPU)), which may be configured to execute portions of the stored code or application modules to perform operations consistent with the disclosed embodiments. Computing system 201 may also include a communications interface, such as one or more wireless transceivers, coupled to the one or more processors for accommodating wired or wireless internet communication with other computing systems and devices operating within computing environment 100. In some instances, computing system 201 may be incorporated into a respective, discrete computing system, although in other instances, computing system 201 may correspond to a distributed computing system having a plurality of interconnected, computing components distributed across an appropriate computing network, such as communications network 120, or to a publicly accessible, distributed or cloud-based computing cluster, such as a computing cluster maintained by Microsoft Azure™, Amazon Web Services™, Google Cloud™, or another third-party provider.

Referring back to FIG. 2, a programmatic interface established and maintained by FI computing system 130, such as API 134 of executed ingestion and pre-processing engine 136, may receive inferencing request 202 and may route inferencing request 202, including the elements of customer data 203 and the one or more system identifiers 204 to executed ingestion and pre-processing engine 136. In some instances, executed ingestion and pre-processing engine 136 may perform operations that store the elements of customer data 203 and the one or more system identifiers 204, within one or more tangible, non-transitory memories of FI computing system 130, e.g., within a portion of aggregated data store 135. As described herein, each of the elements of customer data 203 may be associated with, and include a unique identifier of, a customer of the financial institution. For example, as illustrated in FIG. 2, element 205 of customer data 203, which may be associated with a particular one of the customers and received from computing system 201, may include a customer identifier 206 assigned to the particular customer by FI computing system 130 (e.g., an alphanumeric character string, etc.).

In some instances, FI computing system 130 may perform any of the exemplary processes described herein to generate an input dataset associated with each of the customers identified by the discrete elements of customer data 203, and to apply the adaptively trained, gradient-boosted, decision-tree process described herein to each of the input datasets, in accordance with a predetermined temporal schedule (e.g., on a monthly basis), or in response to a detection of a triggering event. As illustrated in FIG. 2, a process input engine 208 executed by FI computing system 130 may perform operations that access the elements of customer data 203 maintained within aggregated data store 135, and that obtain the customer identifier maintained within a corresponding one of the accessed elements of customer data 203. By way of example, executed process input engine 208 may access element 205 of customer data 203 (e.g., as maintained within aggregated data store 135) and obtain customer identifier 206, which includes, but is not limited to, the alphanumeric character string assigned to the particular customer of the financial institution.

Executed process input engine 208 may also access consolidated data store 132, and perform operations that identify, within consolidated data records 138, a subset 210 of consolidated data records 138 that include customer identifier 206 and as such, are associated with the particular customer of the financial institution identified by element 205 of customer data 203. In some instances, and as illustrated in FIG. 2, each of subset 210 may include customer identifier 206 and as such, may be associated with the particular customer identified by element 205 of customer data 203. Each of subset 210 of consolidated data records 138 may also include a temporal identifier of a corresponding temporal interval, and one or more consolidated elements associated with the particular customer and the interaction of particular customer with the financial institution and with other financial institutions. By way of example, data record 212 of subset 210 may include customer identifier 206, a corresponding temporal identifier 214 (e.g., "2023-11-30," indicating a temporal interval spanning Nov. 1, 2023, through Nov. 30, 2023), and consolidated data tables 216, which identify and characterize the particular customer during the temporal interval. Further, although not illustrated in FIG. 2A, each additional, or alternate, data records within subset 210 may include customer identifier 206, a temporal identifier of a corresponding temporal interval, and corresponding elements of consolidated data that identify and characterize the particular customer during the corresponding temporal interval.

Executed process input engine 208 may also perform operations that obtain, from consolidated data store 132, elements of composition data 170 characterize a composition of an input dataset for the adaptively trained, machine-learning or artificial-intelligence process (e.g., the adaptively trained, gradient-boosted, decision-tree process described herein). In some instances, executed process input engine 208 may parse composition data 170 to obtain the composition of the input dataset, which not only identifies the elements of customer-specific data included within each input data set dataset (e.g., input feature values, as described herein), but also a specified sequence or position of these input feature values within the input dataset. Examples of these input feature values include, but are not limited to, one or more of the candidate feature values extracted, obtained, computed, determined, or derived by executed training input module 148 and packaged into corresponding portions of validation datasets 164, as described herein.

In some instances, and based on the parsed portions of composition data 170, executed process input engine 208 may that identify, and obtain or extract, one or more of the input feature values from one or more of data records maintained within subset 210 of consolidated data records 138 and associated with temporal intervals (e.g., disposed within an extraction interval associated with the trained, machine-learning or artificial-intelligence process, as described herein). Executed process input engine 208 may perform operations that package the obtained, or extracted, input feature values within a corresponding one of input datasets 218, such as input dataset 220 associated with the particular customer identified by element 205 of customer data 203, in accordance with their respective, specified sequences or positions. Further, in some examples, and based on the parsed portions of composition data 170, executed process input engine 208 may perform operations that compute, determine, or derive one or more of the input features values based on elements of data extracted or obtained from the additional ones of the consolidated data records, as described herein. Executed process input engine 208 may perform operations that package each of the computed, determined, or derived input feature values into portions of input datasets 218 in accordance with their respective, specified sequences or positions.

Through an implementation of these exemplary processes, executed process input engine 208 may populate an input dataset associated with the particular customer identified by element 205 of customer data 203, such as input dataset 220 of input datasets 218, with input feature values obtained or extracted from, or computed, determined or derived from element of data within, the data records of subset 210. Further, in some instances, executed process input engine 208 may also perform any of the exemplary processes described herein to generate, and populate with input feature values, an additional one of input datasets 218 for each of the additional, or alternate, customers of the financial institution associated with additional, or alternate, elements of customer data 203. Executed process input engine 208 may package each of the discrete, customer-specific input datasets within input datasets 218, and executed process input engine 208 may provide input datasets 218 as an input to a predictive engine 222 executed by the one or more processors of FI computing system 130.

As illustrated in FIG. 2A, executed predictive engine 222 may perform operations that obtain, from consolidated data store 132, process parameter data 168 that includes a value of one or more process parameters of the adaptively trained, machine-learning or artificial-intelligence process (e.g., the adaptively trained, gradient-boosted, decision-tree process described herein). For example, and as described herein, the process parameter values included within process parameter data 168 may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyperparameters that reduce potential model overfitting (e.g., regularization of pseudo-regularization hyperparameters).

In some examples, and based on portions of process parameter data 168, executed predictive engine 222 may perform operations that establish a plurality of nodes and a plurality of decision trees for the adaptively trained, gradient-boosted, decision-tree process, each of which receive, as inputs (e.g., "ingest"), corresponding elements of input datasets 218. Further, and based on the execution of predictive engine 222, and on the ingestion of input datasets 218 by the established nodes and decision trees of the adaptively trained, gradient-boosted, decision-tree process, FI computing system 130 may perform operations that apply the adaptively trained, gradient-boosted, decision-tree process to each of the input datasets of input datasets 218, including input dataset 220, and that generate an element of predictive output 226 associated with a corresponding one of input datasets 218, and as such, a corresponding one of the customers identified by the elements of customer data 203. As described herein, each of the generated elements of predictive output 226 may include a numerical score indicative of a predicted likelihood of an occurrence of the target event involving the corresponding one of the customers during the target temporal interval. In some examples, the numerical score within each of the elements of predictive output 226 may range from zero to unity, with zero being indicative of a minimal predicted likelihood, and unity being indicative of a maximum predicted likelihood.

As illustrated in FIG. 2A, executed predictive engine 222 may provide the generated elements of predictive output 226 (e.g., either alone, or in conjunction with corresponding ones of input datasets 218) as an input to a post-processing engine 230 executed by the one or more processors of FI computing system 130. In some instances, executed post-processing engine 230 may apply one or more post-processing operations to the elements of predictive output 226, include element 228 of predictive output 226 indicative of the predicted likelihood of the occurrence of the target event involving the customer associated with customer identifier 206, and may package all, or a selected portion, of predictive output 226 into corresponding portions of a response 232, which FI computing system 130 may transmit across communications network 120 to computing system 201.

Further, and based on input datasets 218 and on the elements of predictive output 226 associated with corresponding one of input datasets 218, an explainability module 234 of executed predictive engine 222 may perform any of the exemplary processes described herein generate one or more elements of explainability data 236 that characterize, among other things, a marginal effect of a perturbation in a value of each of the input features specified within process parameter data 168 on an outcome of the trained, machine-learning or artificial-intelligence process (e.g., the trained, gradient-boosted, decision-tree process) and a contribution of each of the input features (e.g., the numerical or categorical features described herein) to predictive output 226 generated by an application of the trained, machine-learning or artificial-intelligence process to input datasets 218. By way of example, executed explainability module 234 may compute inferencing Shapley values in accordance with a Shapley Additive exPlanations (SHAP) process (e.g., when the selected machine learning or artificial intelligence process corresponds to a gradient-boosted decision tree algorithm), or in accordance with an integrated gradient algorithm (e.g., when the selected machine learning or artificial intelligence process corresponds to a deep neural-network process, etc.).

Executed explainability module 172 may, for example, associate each of the computed inferencing Shapley values (e.g., $s_i$) with an identifier (e.g., $f_{ID,i}$) of the corresponding feature (e.g., one of the exemplary feature identifiers maintained within composition data 170), and may associate pairs 238 of feature identifiers and inferencing Shapley values (e.g., $(f_{ID,i}, s_i)$) into a corresponding portion of explainability data 236. In some instances, not illustrated in FIG. 2, executed explainability module 172 may also perform operations that rank each of the associated pairs of feature identifiers and Shapley values based on corresponding ones of inferencing Shapley values (e.g., in descending order), and package the ranked pairs of feature identifiers and inferencing Shapley values into corresponding portions of explainability data 236.

As illustrated in FIG. 2, executed explainability module 234 may perform operations that store the elements of explainability data 236, which include sets of associated pairs 238 of feature identifiers consistent with composition data 170 and inferencing Shapley values, and one or more of input datasets 218 (which include values of the features specified within composition data 170) within a portion of the one or more tangible, non-transitory memories of FI computing system 130, e.g., within data record 240 of explainability data store 180. Executed explainability module 172 may also package inferencing date 242 on which executed predictive engine 222 applied the trained, machine-learning or artificial-intelligence process to input datasets 218 (e.g., Dec. 30, 2024) into a corresponding portion of data record 240.

As described herein, the elements of reference explainability data 174 may characterize, among other things, a baseline relationship between the values of the features within composition data 170 and the predictive output of the trained, and validated, machine-learning or artificial intelligence process on a corresponding process training and validation date, e.g., Jul. 1, 2023. Further, and through a performance of one of more of the exemplary inferencing processes described herein, FI computing system 130 may generate additional elements of explainability data that characterize further the relationship between the values of the features within composition data 170 and the predictive output of the trained, and validated, machine-learning or artificial intelligence process at each successive application of the trained, and validated, machine-learning or artificial intelligence process to corresponding inferencing dates subsequent to the training validation date, such as, but not limited to, the elements of explainability data 236 associated with the inferencing date of Dec. 30, 2024.

B. Exemplary Processes for Dynamically Monitoring Variations in Process Explainability in Distributed Computing Environments In some instances, based on the elements of explainability data characterizing the application of the trained, and validated, machine-learning or artificial intelligence process by executed predictive engine 222 of FI computing system 130 during the one or more temporal intervals subsequent to the process training and validation date of Jul. 1, 2023 (such as, but not limited to, the temporal intervals between the process training and validation date of Jul. 1, 2023, associated with reference explainability data 174) and the inferencing date of Dec. 30, 2024, associated with explainability data 236), the distributed components of FI computing system 130 may perform one or more of the exemplary explainability monitoring operations described herein to determine, and characterize a significance of, a temporal variation in the relative importance of the discrete features within composition data 170, or in the relationship between a magnitude of corresponding ones of the feature values and a magnitude of the predictive output, across the one or more temporal intervals. By way of example, FI computing system 130 may implement one or more of the exemplary explainability monitoring operations described herein during monitoring intervals consistent with a corresponding monitoring schedule, and examples of the monitoring intervals include, but are not limited to, a weekly interval, a monthly interval, or a quarterly interval.

For example, and in accordance with the monitoring schedule, the distributed components of FI computing system 130 may perform operations that obtain elements of first explainability data, such as, but not limited to, the elements of reference explainability data 174 associated with the training and validation of the machine-learning or artificial intelligence process on Jun. 1, 2023, and elements of second explainability data characterizing the application of the trained, machine-learning or artificial intelligence process to corresponding, customer-specific input datasets on inferencing dates disposed within the monitoring interval, such as, but not limited to, the elements of explainability data 236 associated with the inferencing date of Dec. 30, 2024. Based on the obtained elements of first and second explainability data (and in some instances, corresponding ones of validation datasets 164 and input datasets 218), the distributed components of FI computing system 130 may perform operations, described herein, that determine a value of one or more metrics that characterize a temporal variation in the explainability of the trained, machine-learning or artificial intelligence process between the process training and validation date and the corresponding one of the monitoring intervals. As described herein, the temporal evolution in the explainability of the trained, machine-learning or artificial intelligence process may be indicated by a corresponding temporal variation in the relative importance of the discrete features within composition data 170, or in the relationship between a magnitude of corresponding ones of the feature values and a magnitude of the predictive output.

FI computing system 130 may also perform operations, described herein, that apply one or more metric-specific exception criteria to the one or more metric values, and that determine a significance of the temporal variation in the explainability of the trained, machine-learning or artificial intelligence process based on the application of the one or more metric-specific exception criteria to the one or more metric values. In some instances, and based on the application of the one or more metric-specific exception criteria to the one or more metric values, FI computing system 130 may establish that the temporal variation in the explainability between the process training and validation date and the corresponding one of the predetermined monitoring intervals represents a significant variation (e.g., that impacts significantly a predicted capability or accuracy of the trained, machine-learning or artificial-intelligence process or an accuracy and reliability of the predictive output of that trained, machine-learning or artificial-intelligence process), FI computing system 130 may perform operations, described herein, to obtain data characterizing a significance of a temporal variation in the explainability of the trained, machine-learning or artificial intelligence process between the process training and validation date and each of a threshold number of prior monitoring intervals, e.g., that immediately precede the corresponding one of the monitoring intervals.

In some instances, FI computing system 130 may perform operations that establish that significant variation in the explainability of the trained, machine-learning or artificial intelligence process persists across the corresponding one of the monitoring intervals, and each of the threshold number of prior monitoring intervals, and FI computing system 130 may perform operations that modify programmatically at least one of (i) a value of a process parameter that characterizes the machine-learning or artificial-intelligence process (e.g., as maintained within process parameter data 168) and/or (ii) a composition of the input dataset associated with the machine-learning or artificial-intelligence process (e.g., as maintained within composition data 170). By way of example, the determined persistence of the significant variation across the corresponding one of the monitoring intervals, and each the threshold number of prior monitoring intervals may cause FI computing system 130 to generate and transmit, via communications network 120, a notification of the persisting, significant variation to a computing system or device operable by an analyst of a developer, and further, may cause FI computing system 130 to modify a composition or a source of the data tables ingested by ingestion and pre-processing engine 136, and/or to modify a frequency at which ingestion and pre-processing engine 136 ingests the source data tables from corresponding ones of source systems 102. Further, in some instances, the determined persistence of the significant variation across the corresponding one of the monitoring intervals, and the threshold number of the prior monitoring intervals, may trigger a further training and validation of the machine-learning or artificial-intelligence process by FI computing system 130 using any of the exemplary processes described herein.

Certain of these exemplary processes, which enable FI computing system 130 to monitor dynamically a temporal variation an explainability of a trained, machine-learning or artificial intelligence process between the process training and validation date and a corresponding monitoring interval, and to programmatically modify a process parameter value of, or a composition of an input dataset associated with, the trained, machine-learning or artificial intelligence process in response to a determined significance of the temporal variation in the explainability within the corresponding monitoring interval, and persistence of that determined significance across a threshold number of prior monitoring intervals, may be implemented in additional to, or as an alternate to, existing processes for modelling and quantifying process performance or a distribution of predictive output of machine-learning or artificial-intelligence processes.

Figure 3A:
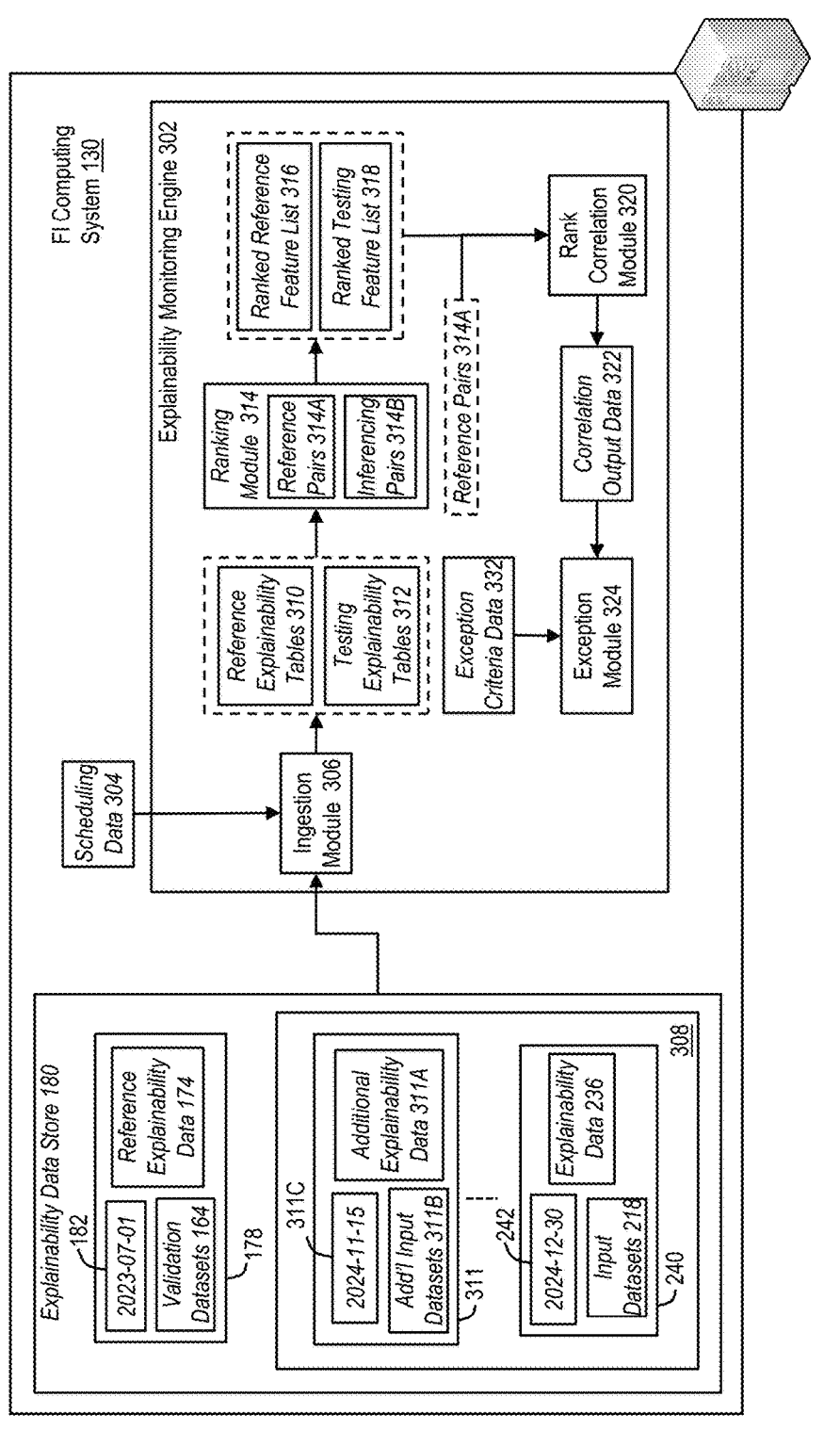

Referring to FIG. 3A, the one or more processors of FI computing system 130 (e.g., one or more of the distributed computing components described herein) may execute an explainability monitoring engine 302, and executed explainability monitoring engine 302 may perform one or more of the exemplary processes described herein to dynamically monitor a temporal variation in one or more metric values characterizing an explainability of a trained, machine-earning or artificial-intelligence process (such as, but not limited to, the trained, gradient-boosted, decision-tree process described herein) between a date of initial process training and validation (e.g., the process training and validation date of Jul. 1, 2023, as described herein) and each of a plurality of subsequent, and successive, monitoring intervals of predetermined duration. As described herein, the predetermined duration of the successive monitoring intervals may include, but is not limited to, an interval of one week, one month, or a calendar quarter (e.g., three months) and in some instances, FI computing system 130 may establish the predetermined duration based on, among other things, a frequency at which FI computing system 130 performs inferencing operations involving the trained, machine-earning or artificial-intelligence process and additionally, or alternatively, based one or more process validation or monitoring protocols imposed by the financial institution.

As illustrated in FIG. 3A, executed explainability monitoring engine 302 may obtain, from the one or more tangible, non-transitory memories of FI computing system 130, elements of scheduling data 304 that specify a monitoring schedule associated with the trained, machine-earning or artificial-intelligence process. The obtained elements of scheduling data 304 may, for example, include the predetermined duration of the successive monitoring intervals, and may further include, among other things, initiation data characterizing a predetermined date (or time) at which executed explainability monitoring engine 302 initiates a performance of one or more of the exemplary, dynamic monitoring processes described herein within corresponding ones of the successive monitoring intervals. By way of example, the obtained elements of scheduling data may indicate that the successive monitoring intervals include quarterly intervals (e.g., associated with a predetermined duration of three months), and may further indicate that executed explainability monitoring engine 302 initiates the performance of one or more of the exemplary, dynamic monitoring processes described herein on the final day of each quarter (e.g., based on elements of explainability data generated by FI computing system 130 during that quarter using any of the exemplary processes described herein).

An ingestion module 306 of executed explainability monitoring engine 302 may receive the elements of scheduling data 304, and based on the elements of scheduling data 304, executed ingestion module 306 may determine that the successive monitoring intervals include a three-month quarter ranging from Oct. 1, 2024, to Dec. 31, 2024, and may determine to initiate the performance of the one or more of the exemplary, dynamic monitoring processes described herein on Dec. 31, 2024, e.g., the final day of the three-month quarter. In some instances, and response to the determined initiation, executed ingestion module 306 may access reference data record 178 maintained within explainability data store 180 (e.g., within the one or more tangible, non-transitory memories of FI computing system 130), and obtain reference explainability data 174. As described herein, reference explainability data 174 may include sets of associated pairs of feature identifiers and corresponding reference Shapley values (e.g., $(f_{ID,i}, s_i)$) generated by FI computing system 130 during the adaptive training and validation of the machine-learning or intelligence process on Jul. 1, 2023, using validation datasets 164.

Executed ingestion module 306 may also perform operations that access a plurality of additional data records maintained within explainability data store 180, which maintain additional elements of explainability data associated with applications of the trained, machine-learning or intelligence process to input datasets on inferencing dates subsequent to the initial training and validation date of Jul. 1, 2023. In some instances, and based on corresponding elements of temporal data, executed ingestion module 306 may determine that a subset 308 of the additional data records are associated with inferencing dates disposed within the three-month quarter ranging from Oct. 1, 2024, to Dec. 31, 2024. For example, subset 308 may include data record 240, which includes explainability data 236 include associated pairs of feature identifiers and inferencing Shapley values generated by FI computing system 130 during the application of the trained machine-learning or intelligence process to corresponding ones of input datasets 218 on Dec. 30, 2024 (e.g., as specified by inferencing date 242).

Further, subset 308 may also include one or more additional data records that maintain elements of additional explainability data associating each of the feature identifiers with corresponding additional inferencing Shapley values generated by FI computing system 130 during the application of the trained machine-learning or intelligence process to additional input datasets on inferencing dates subsequent to the initial training and validation date of Jul. 1, 2023. For example, as illustrated in FIG. 3A, additional data record 311 may include additional explainability data 311A that includes sets of associated pairs of feature identifiers and additional inferencing Shapley values generated by FI computing system 130 during the application of the trained machine-learning or intelligence process to corresponding ones of additional input datasets 311B on an inferencing date of Nov. 15, 2024 (e.g., as specified by inferencing date 311C). As described herein, the inferencing date of Nov. 15, 2024 is disposed subsequent to the initial training and validation date of Jul. 1, 2023, and within the three-month quarter ranging from Oct. 1, 2024, to Dec. 31, 2024. Executed ingestion module 306 may perform operations that access each of subset 308 of the additional data records, and obtain (e.g., ingest) the elements of explainability data maintained within each of accessed subset 308, including, but not limited to, the elements of explainability data 236 and additional explainability data 311A.

As described herein, reference explainability data 174 may include sets of associated pairs of feature identifiers and reference Shapley values (e.g., $(f_{ID,i}, s_i)$) generated by FI computing system 130 during the adaptive training and validation of the machine-learning or intelligence process on Jul. 1, 2023 using corresponding ones of validation datasets 164. In some instances, executed ingestion module 306 may apply one or more data pre-processing operations to the associated pairs of feature identifiers and reference Shapley values within reference explainability data 174. Based on the application of the one or more data pre-processing operations to the associated pairs of feature identifiers and reference Shapley values, executed ingestion module 306 may identify and obtain the reference Shapley values associated with corresponding ones of the feature identifiers, and for each of the feature identifiers, package the corresponding feature identifier and each of the identified and obtained reference Shapley values into a corresponding element of reference explainability tables 310.

Further, as described herein, each of the additional elements of explainability data, including the elements of explainability data 236 and additional explainability data 311A, may also include sets of associated pairs of feature identifiers and inferencing Shapley values generated through the application of the trained machine-learning or intelligence process to corresponding ones of the additional input datasets (e.g., input datasets 218, additional input datasets 311B, etc.) on the inferencing dates disposed subsequent to the initial training and validation date of Jul. 1, 2023, and within the three-month quarter ranging from Oct. 1, 2024, to Dec. 31, 2024. In some instances, and based on the application of the one or more data pre-processing operations to the associated pairs of feature identifiers and inferencing Shapley values maintained within elements of explainability data 236 and additional explainability data 311A, executed ingestion module 306 may perform any of the exemplary processes described herein to identify and obtain the inferencing Shapley values associated with corresponding ones of the feature identifiers, and for each of the feature identifiers, package the corresponding feature identifier and each of the obtained inferencing Shapley values into a corresponding element of testing explainability tables 312.

The elements of testing explainability tables 312 may, for example, associate each of the feature identifiers with corresponding ones of the inferencing Shapley values derived through the application of the trained machine-learning or intelligence process to corresponding ones of the additional input datasets, e.g., on inferencing dates disposed subsequent to the initial training and validation date of Jul. 1, 2023, and within the three-month quarter ranging from Oct. 1, 2024, to Dec. 31, 2024). As illustrated in FIG. 3A, executed ingestion module 306 may provide reference explainability tables 310 and testing explainability tables 312 as inputs to a ranking module 314 of executed explainability monitoring engine 302.

In some instances, executed ranking module 314 may receive reference explainability tables 310 and testing explainability tables 312 from executed ingestion module 306. As described herein, reference explainability tables 310 may associate each of the feature identifiers with a corresponding plurality of the reference Shapley values, and testing explainability tables 312 may associates each of the feature identifiers with a corresponding plurality of the inferencing Shapley values. The reference and inferencing Shapley values may, for example, include positive values (e.g., indicating a positive contribution of a corresponding feature to the predictive output of the trained, machine-learning or artificial-intelligence process) and negative values (e.g., indicating a negative contribution of a corresponding feature to the predictive output of the trained, machine-learning or artificial-intelligence process). Executed ranking engine may, for example, compute an absolute value of each of the reference and inferencing Shapley values (e.g., to determine a magnitude of the corresponding one of the reference and inferencing Shapley values), and generate absolute reference and inferencing Shapley values.

For each of the feature identifiers maintained within the elements of reference explainability tables 310, executed ranking module 314 may compute an average of a corresponding plurality of absolute reference Shapley values (e.g., as an arithmetic mean, a geometric mean, etc.). Executed ranking module 314 may associate the computed average of the absolute reference Shapley values with the corresponding one of the feature identifiers, and may store the associated reference pairs 314A of feature identifiers and average, absolute reference Shapley values within a corresponding portion of the one or more tangible, non-transitory memories of FI computing system 130 (not illustrated in FIG. 3A). In some instances, executed ranking module 314 may also perform operations that sort the feature identifiers based on corresponding ones of the average, absolute reference Shapley values, and that generate a reference list 316 of feature identifiers ranked in a descending order of the corresponding ones of the average, absolute reference Shapley values (e.g., for N feature identifiers, $(f_{ID,1}, f_{ID,3}, f_{ID,6}, f_{ID,2}, \ldots, f_{ID,N})$).

Further, for each of the feature identifiers maintained within the elements of testing explainability tables 312, executed ranking module 314 may compute an average of a corresponding plurality of absolute inferencing Shapley values (e.g., as an arithmetic mean, a geometric mean, etc.). Executed ranking module 314 may associate the computed average of the absolute inferencing Shapley values with the corresponding one of the feature identifiers, and may store the associated inferencing pairs 314B of feature identifiers and average, absolute inferencing Shapley values within a corresponding portion of the one or more tangible, non-transitory memories of FI computing system 130 (not illustrated in FIG. 3A). In some instances, executed ranking module 314 may also perform operations that sort the feature identifiers based on corresponding ones of the average, absolute inferencing Shapley values, and that generate a testing list 318 of feature identifiers ranked in a descending order of the corresponding ones of the average, absolute inferencing Shapley values (e.g., for N feature identifiers, $(f_{ID,1}, f_{ID,2}, f_{ID,6}, f_{ID,N-2}, \ldots, f_{ID,N})$). Executed ranking module 314 may provide reference list 316 of the ranked feature identifiers and testing list 318 of the ranked feature identifiers as inputs to a rank correlation module 320 of executed explainability monitoring engine 302.

Executed rank correlation module 320 may receive reference list 316 of the ranked feature identifiers and testing list 318 of the ranked feature identifiers. As described herein, executed rank correlation module 320 may apply one or more statistical processes to corresponding portions of reference list 316 and testing list 318 to measure, and characterize numerically, changes in a sequential ranking of the feature identifiers between reference list 316 and testing list 318 (e.g., listing features ranked in a descending order of respective ones of the average, absolute reference Shapley values and the average, absolute inferencing Shapley values), as such, to characterize a temporal variation in the relative importance of the discrete features within composition data 170, or in the relationship between a magnitude of corresponding ones of the feature values and a magnitude of the predictive output, between the initial training and validation date of Jul. 1, 2023, and the corresponding monitoring interval (e.g., the conclusion of the three-month quarter ranging from Oct. 1, 2024, to Dec. 31, 2024).

In some instances, and through the application of the statistical processes, executed rank correlation module 320 may determine a value of a weighted Kendall rank correlation coefficient (e.g., a weighted Kendall's $\tau$ coefficient) between reference list 316 of the ranked feature identifiers (e.g., for N feature identifiers, $(f_{ID,1}, f_{ID,3}, f_{ID,6}, f_{ID,2}, \ldots, f_{ID,N})$) and testing list 318 of the ranked feature identifiers (e.g., for N feature identifiers, $(f_{ID,1}, f_{ID,2}, f_{ID,6}, f_{ID,N-2}, \ldots, f_{ID,N})$), using the average, absolute reference Shapley values associated with corresponding ones of the ranked feature identifiers as weight factors (e.g., maintained within reference pairs 314A of feature identifiers and average, absolute reference Shapley). As described herein, the value of weighted Kendall rank correlation coefficient may range from zero to unity, with a value of zero indicative of a minimum correlation between the sequential rankings of the feature identifiers in reference list 316 and testing list 318 (and a maximum amount of change between these sequential rankings), and with a value of unity indicative of a maximum correlation between the sequential rankings of the feature identifiers in reference list 316 and testing list 318 (and a minimum amount of change, or no change, between these sequential rankings). Executed rank correlation module 320 may package the computed value of weighted Kendall rank correlation coefficient into a corresponding portion of correlation output data 322, which executed rank correlation module 320 may provide as an input to an exception module 324 of executed explainability monitoring engine 302.

Referring to FIG. 3B, executed exception module 324 may receive correlation output data 322, which includes the computed value of weighted Kendall rank correlation coefficient. Executed exception module 324 perform operations that store at least a portion of correlation output data 322 (including the computed value of weighted Kendall rank correlation coefficient) and a unique, alphanumeric interval identifier 326 of the corresponding monitoring interval (e.g., "2024-Q4," which represents the three-month quarter ranging from Oct. 1, 2024, to Dec. 31, 2024) within the one or more tangible, non-transitory memories of FI computing system 130, e.g., within monitoring record 328 of monitoring data store 330.

Executed exception module 324 may also obtain one or more elements of exception criteria data 332 that specify, for the trained machine-learning or artificial intelligence process, threshold values, or ranges of threshold values, of the weighted Kendall rank correlation coefficient, which characterize, and are associated with, corresponding levels of significance of the changes of the sequential rankings of the feature identifiers between reference list 316 and testing list 318. By way of example, one or more elements of exception criteria data 332 may associate values of the weighted Kendall rank correlation coefficient that exceed a first threshold value (e.g., 0.70, etc.) with a "satisfactory" threshold exception, which indicates a satisfactory and, in some instances, a minimal level of change in the sequential rankings of the feature identifiers between the reference list 316 and testing list 318.

Further, in some examples, the one or more elements of exception criteria data 332 may associate values of the weighted Kendall rank correlation coefficient disposed between a second threshold value (e.g., 0.50, etc.) and the first threshold value (e.g., 0.70, etc.) with a "moderate" threshold exception, which indicates a moderate level of change in the sequential rankings of the feature identifiers between the reference list 316 and testing list 318. As described herein, and responsive to the moderate threshold exception, FI computing system 130 may perform operations that generate, and transmit across communications network 120 to a computing system or device operable by an analyst, an alarm message indicating the moderate threshold exception, which when presented by the computing system or device to the analyst via a corresponding computing device, prompts the analyst to investigate a cause of the moderate threshold exception associated with the machine-learning or artificial-intelligence process.

Additionally, in some examples, the one or more elements of exception criteria data 332 may associate values of the weighted Kendall rank correlation coefficient that fail to exceed the second threshold value (e.g., 0.30, etc.) with a "significant" threshold exception, which indicates a significant level of change in the sequential rankings of the feature identifiers between the reference list 316 and testing list 318. As described herein, the association of the value of the weighted Kendall rank correlation coefficient with the significant threshold exception during the corresponding monitoring interval (e.g., the three-month quarter ranging from Oct. 1, 2024, to Dec. 31, 2024) may trigger a performance, by FI computing system 130, of operations that modify programmatically at least one of (i) a value of a process parameter that characterizes the machine-learning or artificial-intelligence process (e.g., as maintained within process parameter data 168) and/or (ii) a composition of the input dataset associated with the machine-learning or artificial-intelligence process (e.g., as maintained within composition data 170) based on a determination that the significant threshold condition persists during a threshold number of prior monitoring intervals. The threshold number of prior monitoring intervals may, for example, include four consecutive monitoring intervals that precede immediately the corresponding monitoring interval (e.g., four consecutive quarters prior to the three-month quarter ranging from Oct. 1, 2024, to Dec. 31, 2024), and may be specified within the elements of exception criteria data 332.

Referring back to FIG. 3B, executed exception module 324 may parse correlation output data 322 and obtain the computed value of the Kendall rank correlation coefficient associated with the corresponding monitoring interval (e.g., the three-month quarter ranging from Oct. 1, 2024, to Dec. 31, 2024. In some instances, the computed value of the Kendall rank correlation coefficient may correspond to 0.23, and based on the elements of exception criteria 332, executed exception module 324 may associate the computed value of 0.23 with a significant threshold exception (e.g., indicating a significant level of change in the sequential rankings of the feature identifiers between the reference list 316 and testing list 318), and may provide, to a persistence module 336 of executed explainability monitoring engine 302, elements of significant threshold exception data 334 characterizing the occurrence of the significant threshold exception during the corresponding monitoring interval.

Executed persistence module 336 may receive data 334, which confirms the occurrence of the significant threshold exception, and may access the elements of exception criteria data 332 and obtain data characterizing the threshold number of prior monitoring intervals, e.g., the four consecutive monitoring intervals that precede immediately the corresponding monitoring interval. As described herein, the corresponding monitoring interval may include three-month quarter ranging from Oct. 1, 2024, to Dec. 31, 2024, and the four consecutive monitoring intervals that precede immediately the corresponding monitoring interval may include, but are not limited to, a first prior quarter ranging from Jul. 1, 2024, to Sep. 30, 2024, a second prior quarter ranging from Apr. 1, 2024, to Jun. 30, 2024, a third prior quarter ranging from Jan. 1, 2024, to Mar. 31, 2024, and a fourth prior quarter ranging from Oct. 1, 2023, to Dec. 31, 2023. In some instances, executed persistence module 336 may access monitoring data store 330, and may identify monitoring records 338, 340, 342, and 344 associated, respectively, the first, second, third, and fourth prior quarters, e.g., based on corresponding ones of interval identifiers 338A, 340A, 342A, and 344A.

Further, executed persistence module 336 may obtain, from monitoring records 338, 340, 342, and 344, correlation data elements 338B, 340B, 342B, and 344B that include respective ones of the values of the Kendall rank correlation coefficient computed during the first, second, third, and fourth prior quarters. In some instances, executed persistence module 336 parse correlation data elements 338B, and determine that the value of the Kendall rank correlation coefficient computed during the first prior quarter corresponding to 0.27. As described herein, and based on the elements of exception criteria data 332, executed persistence module 336 may associate the computed value of 0.27 during the first prior quarter with a significant threshold exception, indicating a significant level of change in the sequential rankings of the feature identifiers between reference list 316 and a corresponding testing list associated with the first prior quarter. Executed persistence module 336 may also perform any of the exemplary operations described herein to parse correlation data elements 340B, 342B, and 344B, obtain values of 0.25, 0.29, and 0.28 for the Kendall rank correlation coefficients during respective ones of the second, third, and fourth prior quarters, and associate each of the computed values of 0.25, 0.29, and 0.28 during the third, and fourth priors quarters, respectively, with the significant threshold exception.

Based on the determination that the significant threshold exception not only exists within the corresponding monitoring interval (e.g., the three-month quarter ranging from Oct. 1, 2024, to Dec. 31, 2024), but also persists across the threshold number of prior monitoring intervals (e.g., the first, second, third, and fourth prior quarters), executed persistence module 336 may generate one or more elements of trigger data 346 that include at least a portion of correlation output data 322, which include the value of 0.23 for the Kendall rank correlation coefficient computed during the corresponding monitoring interval, and data 325 that confirms the existence of the significant threshold exception during the corresponding monitoring interval, and the persistence of that significant threshold exception across the threshold number of prior monitoring intervals. As illustrated in FIG. 3B, executed explainability monitoring engine 302 may provide trigger data 346, including the portion of correlation output data 322 and confirmation data 325 as an input to a process modification engine 350 executed by the one or more processors of FI computing system 130. In some instances, and based on the portion of correlation output data 322 and confirmation data 325, executed process modification engine 350 may perform operations, described herein, that modify programmatically at least one of (i) a value of a process parameter that characterizes the machine-learning or artificial-intelligence process (e.g., as maintained within process parameter data 168) and/or (ii) a composition of the input dataset associated with the machine-learning or artificial-intelligence process (e.g., as maintained within composition data 170) in accordance with the existing, and persisting, significant threshold exception.

In some instances, FI computing system 130 may perform any of the exemplary processes described herein to monitor a temporal variation in an explainability of a trained, machine-learning or artificial-intelligence process based on a metric value that characterize a change in the sequential rankings of one or more features of a machine-learning or artificial-intelligence processes between an initial raining or validation date and one or more subsequent monitoring intervals, such as, but not limited to, such as a value Kendall rank correlation coefficient computing during a corresponding monitoring interval (e.g., the value of the Kendall T coefficient described herein). The disclosed embodiments are, however, not limited to monitoring processes that leverage metric values characterizing changes in sequential feature rankings, and in other examples, described herein in reference to FIGS. 4A and 4B, FI computing system 130 may perform any of the exemplary processes described herein to monitor a temporal variation in an explainability of a trained, machine-learning or artificial-intelligence process based on a measured deviation of inferencing Shapley values associated with corresponding features of a trained, machine-learning or artificial-intelligence process from an established, baseline confidence interval during one, or more subsequent monitoring intervals.

Figure 4A:
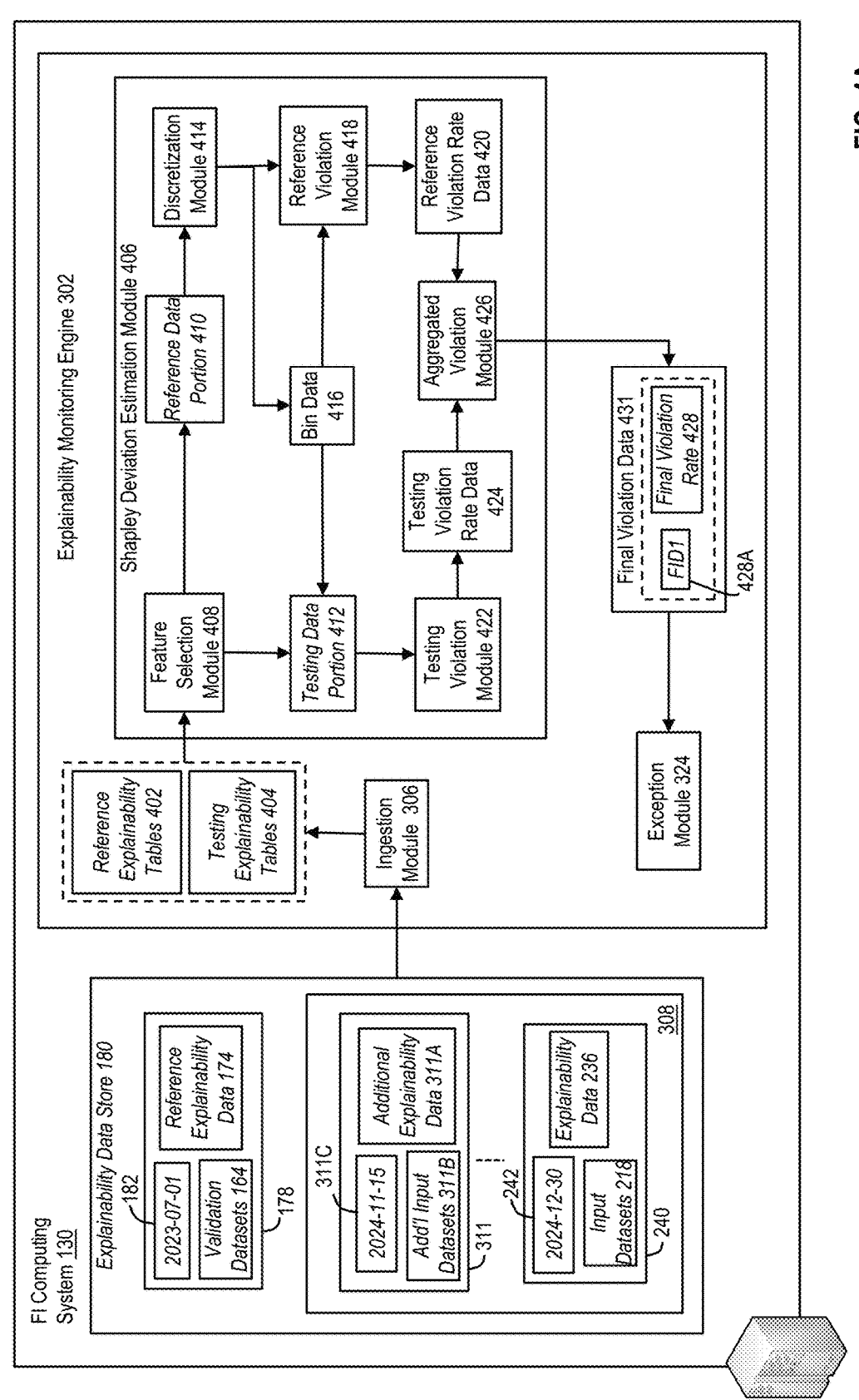

Referring to FIG. 4A, executed ingestion module 306 of executed explainability monitoring engine 302 may perform any of the exemplary processes described herein, on Dec. 31, 2024 during the corresponding monitoring interval (e.g., the three-month quarter ranging from Oct. 1, 2024, to Dec. 31, 2024), to ingest the elements of reference explainability data 174 and to ingest, from identified subset 308, elements of explainability data 236 and additional explainability data 311A. As described herein, reference explainability data 174 may include discrete sets of associated pairs of feature identifiers and corresponding reference Shapley values (e.g., ($f_{ID,i}$, $s_i$)) generated by FI computing system 130 during the adaptive training and validation of the machine-learning or intelligence process on Jul. 1, 2023 using corresponding ones of validation datasets 164 (e.g., as specified within initial training and validation date 182). In some instances, the sequential ordering of the associated pairs of feature identifiers and corresponding reference Shapley values within each of the discrete sets of reference explainability data 174 may be consistent with the sequence or position of these feature values specified within composition data 170.

Further, and as described herein, explainability data 236 may include discrete sets of associated pairs of feature identifiers and corresponding inferencing Shapley values generated by FI computing system 130 during the application of the trained machine-learning or intelligence process to corresponding ones of input datasets 218 on Dec. 30, 2024 (e.g., as by inferencing date 242), and additional explainability data 311A may include discrete sets of associated pairs of feature identifiers and additional inferencing Shapley values generated by FI computing system 130 during the application of the trained machine-learning or intelligence process to corresponding ones of additional input datasets 311B on an inferencing date of Nov. 15, 2024 (e.g., as specified by inferencing date 311C). In some instances, the sequential ordering of the associated pairs of feature identifiers and corresponding inferencing Shapley values within each of the discrete sets of explainability data 236, and within additional explainability data 311A, may be consistent with the sequence or position of these feature values specified within composition data 170.

Referring back to FIG. 4A, executed ingestion module 306 may also perform operation that obtain, from reference data record 178, a plurality of validation datasets 164 associated with the adaptive training and validation of the machine-learning or intelligence process on Jul. 1, 2023, and that obtain, from identified subset 308, input datasets 218 (e.g., associated with explainability data 236 within data record 240) and additional input datasets 311B (associated with additional explainability data 311A within data record 311). As described herein, each of validation datasets 164, input datasets 218, and additional input datasets 311B may include a discrete set of values of corresponding features (e.g., a feature vector) having a composition and a sequential order consistent with the elements of composition data 170.

Further, each of the discrete sets of associated pairs of feature identifiers and corresponding reference Shapley values within reference explainability data 174 may be associated with a corresponding one of the discrete sets of feature values within validation datasets 164 (e.g., and a corresponding one of validation datasets 164). In some instances, executed ingestion module 306 may access an initial one of the discrete sets of associated pairs of feature identifiers and corresponding reference Shapley values within reference explainability data 174, and may access the corresponding one of validation datasets 164. Executed ingestion module 306 may also perform one or more data processing operations that augment each of the associated pairs of feature identifiers and corresponding reference Shapley values within the accessed, discrete set to include a corresponding one of the feature values maintained within the accessed validation dataset of validation datasets 164, and to store the associated groups of feature identifiers, corresponding reference Shapley values, and corresponding feature values within a portion of reference explainability tables 402 (e.g., as reference data samples). Executed ingestion module 306 may perform one or more of these exemplary processes to generate, and store within reference explainability tables 402, associated groups (e.g., reference data samples) of feature identifiers, corresponding reference Shapley values, and corresponding feature values for each additional, or alternate, one of the discrete sets of associated pairs of feature identifiers and corresponding reference Shapley values within reference explainability data 174 and a corresponding additional, or alternate one, of validation datasets 164.

Additionally, each of the discrete sets of associated pairs of feature identifiers and corresponding inferencing Shapley values within explainability data 236 may be associated with a corresponding one of the discrete sets of feature values within input datasets 218, and each of the discrete sets of associated pairs of feature identifiers and corresponding inferencing Shapley values within additional explainability data 311A may be associated with a corresponding one of the discrete sets of feature values within additional input datasets 311B. In some instances, executed ingestion module 306 may access an initial one of the discrete sets of associated pairs of feature identifiers and corresponding, inferencing Shapley values within reference explainability data 236, and may access the corresponding one of input datasets 218. As described herein, executed ingestion module 306 may perform one or more data processing operations that augment each of the associated pairs of feature identifiers and corresponding inferencing Shapley values within the accessed, discrete set of explainability data 236 to include a corresponding one of the feature values maintained within the corresponding one of input datasets 218, and to store the associated groups of feature identifiers, corresponding inferencing Shapley values, and corresponding feature values within a portion of testing explainability tables 404. Executed ingestion module 306 may also perform one or more of these exemplary processes to generate, and store within testing explainability tables 404, additional associated groups of feature identifiers, corresponding inferencing Shapley values, and corresponding feature values for each additional, or alternate, one of the discrete sets of associated pairs of feature identifiers and corresponding inferencing Shapley values within explainability data 236 and a corresponding additional, or alternate one, of input datasets 218.

Executed ingestion module 306 may also access an initial one of the discrete sets of associated pairs of feature identifiers and corresponding inferencing Shapley values within reference additional explainability data 311A, and may access the corresponding one of additional input datasets 311B. As described herein, executed ingestion module 306 may perform one or more data processing operations that augment each of the associated pairs of feature identifiers and corresponding inferencing Shapley values within the accessed, discrete set of additional explainability data 311A to include a corresponding one of the feature values maintained within the corresponding one of additional input datasets 311B, and to store the associated groups of feature identifiers, corresponding inferencing Shapley values, and corresponding feature values within an additional portion of testing explainability tables 404. Executed ingestion module 306 may also perform one or more of these exemplary processes to generate, and store within testing explainability tables 404, further associated groups of feature identifiers, corresponding inferencing Shapley values, and corresponding feature values for each additional, or alternate, one of the discrete sets of associated pairs of feature identifiers and corresponding inferencing Shapley values within additional explainability data 311A and a corresponding additional, or alternate one, of additional input datasets 311B. In some instances, executed ingestion module 306 may store each of reference explainability tables 402 and testing explainability tables 404 within the one or more tangible, non-transitory memories of FI computing system 130 (not illustrated in FIG. 4A).

Further, executed ingestion module 306 may provide reference explainability tables 402 and testing explainability tables 404 as an input to a Shapley deviation estimation module 406 of executed explainability monitoring engine 302. For example, as illustrated in FIG. 4A, a feature selection module 408 of executed Shapley deviation estimation module 406 may receive (or access) reference explainability tables 402 and testing explainability tables 404, and may process reference explainability tables 402 and testing explainability tables 404 to select an initial one of the features of the trained, machine learning or artificial-intelligence process. The initial selected feature may, for example, corresponding to an initial one of the sequential features (e.g., associated with feature identifier $f_{ID,1}$) specified within composition data 170, and included within the groups of feature identifiers, corresponding Shapley values (e.g., the reference and inferencing Shapley values described herein), and corresponding feature values maintained within each of reference explainability tables 402 and testing explainability tables 404.

Based on the feature identifier of the initial selected feature, executed feature selection module 408 may perform operations that identify a subset of the groups of feature identifiers, corresponding reference Shapley values, and corresponding feature values maintained within reference explainability tables 402 that include the feature identifier of the selected initial feature, and that package the identified subset into reference data portion 410. Further, and based on the feature identifier of the initial selected feature, executed feature selection module 408 may also perform operations that identify an additional subset of the groups of feature identifiers, corresponding inferencing Shapley values, and corresponding feature values maintained within testing explainability tables 404 that include the feature identifier of the selected initial feature, and that package the identified additional subset into testing data portion 412. Executed feature selection module 408 may store reference data portion 410 and testing data portion 412 within the one or more tangible, non-transitory memories of FI computing system 130, and may provide reference data portion 410 as an input to a discretization module 414 of executed Shapley deviation estimation module 406.

In some instances, executed discretization module 414 may receive reference data portion 410, and may parse the groups of feature identifiers, corresponding reference Shapley values, and corresponding feature values within reference data portion 410 to determine a numerical range of the corresponding feature values. Executed discretization module 414 may perform operations that discretize the determined numerical range into a plurality of discrete, non-overlapping bins (e.g., a total of K bins), and may package data characterizing each of the discrete, non-overlapping bins, including the feature-value boundaries of each of the discrete, non-overlapping bins, into a corresponding portion of bin data 416, which executed discretization module 414 may store within the one or more tangible, non-transitory memories of FI computing system 130. Further, executed discretization module 414 may also provide bin data 416, and in some instances, reference data portion 410, as an input to a reference violation module 418 of executed Shapley deviation estimation module 406.

Executed reference violation module 418 may receive bin data 416 and reference data portion 410, and based on the data characterizing each of the discrete, non-overlapping bins, executed reference violation module 418 may perform operations that assign each of the groups (e.g., reference data samples) of feature identifiers, corresponding reference Shapley values, and corresponding feature values within reference data portion 410 to a corresponding one of the discrete, non-overlapping bins based on the corresponding feature values and the feature-value boundaries of each of the discrete, non-overlapping bins (e.g., to "bin" the groups of feature identifiers, corresponding reference Shapley values, and corresponding feature values). Further, and for each of the discrete, non-overlapping bins, executed reference violation module 418 may perform operations, described herein, to establish a bin-specific confidence interval over the reference Shapley values within corresponding ones of the assigned groups.

By way of example, and for each of the discrete, non-overlapping bins, executed reference violation module 418 may access the reference Shapley values maintained within corresponding ones of the assigned groups, and may compute a bin-specific, average reference Shapley value across the corresponding ones of the assigned groups (e.g., an arithmetic mean, a geometric mean, etc.). Executed reference violation module 418 may also establish a corresponding alpha value for the confidence interval, and then establish the bin-specific confidential interval, and the upper and lower boundaries of that confidence interval, for each of the discrete, non-overlapping bins based on the computed, bin-specific, average reference Shapley value and the established alpha value. The established alpha value may include, but not limited to, an alpha value of 0.5, and in some instances, executed reference violation module 418 may determine the alpha value, and the bin-specific confidence interval associated with each discrete, non-overlapping bins, based on one or more statistical properties of the reference Shapley values, or the feature values, within corresponding ones of the assigned groups, such as, but not limited to, computed standard deviations of the reference Shapley values of one or more of the discrete, non-overlapping bins.

In some instances, for each of the discrete, non-overlapping bins, executed reference violation module 418 may determine a total number of the assigned groups of groups of feature identifiers, corresponding reference Shapley values, and corresponding feature values (e.g., $(N_{k,i})_{REF}$ with k representing one of the K discrete bins, and i representing one of the K discrete bins, and i representing the initial selected feature), and may establish a number of assigned groups having reference Shapley values disposed outside of the bin-specific confidence interval established about the bin-specific, average reference Shapley value (e.g., $$\left(N_{k,j}^{out}\right)_{REF},$$

with k representing one of the K discrete bins, and i representing the initial selected feature). Further, executed reference violation module 418 may compute, for each of the discrete, non-overlapping bins, a bin-specific reference violation rate as a ratio of (i) the number of assigned groups having reference Shapley values disposed outside of the bin-specific confidence interval for the corresponding non-overlapping bin and (ii) the total number of groups assigned to the corresponding non-overlapping bin and (e.g., as $$(\rho_{k,i})_{REF} = (N_{k,j}^{out})_{REF}/(N_{k,j})_{REF},$$

with k representing one of the K discrete bins, i representing the initial selected feature, and $(\rho_{i,k})_{REF}$ representing the bin-specific reference violation rate for the $k^{th}$ one of the discrete, non-overlapping bins. In some instances, reference violation module 418 may store each of the bin-specific reference violation rates within the one or more tangible, non-transitory memories of FI computing system 130, and may package the bin-specific reference violation rates into corresponding portions of reference violation rate data 420, e.g., as a vector $((\rho_{1,i})_{REF}, \ldots, (\rho_{K,i})_{REF})$, with K representing the total number of discrete bins, and i representing the initial selected feature.

Further, in some instances a testing violation module 422 of executed Shapley deviation estimation module 406 may obtain, from the within the one or more tangible, non-transitory memories of FI computing system 130, testing data portion 412 and bin data 416. As described herein, testing data portion 412 may include groups of feature identifiers, corresponding inferencing Shapley values, and corresponding feature values maintained within testing explainability tables 404 that include the feature identifier of the selected initial feature, and bin data 416 includes data characterizing each of the discrete, non-overlapping bins, such as, but not limited to the feature-value boundaries of each of the discrete, non-overlapping bins.

Based on the data characterizing each of the discrete, non-overlapping bins, executed testing violation module 422 may perform any of the exemplary processes described herein that assign each of the groups (testing data samples) of feature identifiers, corresponding inferencing Shapley values, and corresponding feature values within testing data portion 412 to a corresponding one of the discrete, non-overlapping bins based on the corresponding feature values and the feature-value boundaries of each of the discrete, non-overlapping bins. Further, and for each of the discrete, non-overlapping bins, executed testing violation module 422 may perform operations, described herein, to establish a bin-specific confidence interval over the inferencing Shapley values within corresponding ones of the assigned groups.

By way of example, and for each of the discrete, non-overlapping bins, executed testing violation module 422 may access the inferencing Shapley values maintained within corresponding ones of the assigned groups of testing data portion 412, and may compute a bin-specific, average testing Shapley value across the corresponding ones of the assigned groups (e.g., an arithmetic mean, a geometric mean, etc.). Executed testing violation module 422 may also perform any of the exemplary processes described herein to determine a corresponding alpha value for the confidence interval, such as, but not limited to, the alpha value of 0.5, and to establish the bin-specific confidential interval, and the upper and lower boundaries of that confidence interval, for each of the discrete, non-overlapping bins based on the computed, bin-specific, average testing Shapley value and the established alpha value. In some instances, for each of the discrete, non-overlapping bins, executed testing violation module 422 may determine a total number of the assigned groups of feature identifiers, corresponding inferencing Shapley values, and corresponding feature values (e.g., $(N_{k,i})_{TEST}$ with k representing one of the K discrete bins, and i representing the initial selected feature), and may determine a number of assigned groups having inferencing Shapley values disposed outside of the bin-specific confidence interval established about the bin-specific, average testing Shapley value (e.g., $$(N_{k,j}^{out})_{TEST},$$

with k representing one of the K discrete bins, and i representing the initial selected feature).

Further, executed testing violation module 422 may also compute, for each of the discrete, non-overlapping bins, a bin-specific testing violation rate as a ratio of (i) the number of assigned groups having inferencing Shapley values disposed outside of the bin-specific confidence interval for the corresponding non-overlapping bins and (ii) the total number of groups (e.g., including the inferencing Shapley values, etc.) assigned to the corresponding non-overlapping bin and (e.g., as $$(\rho_{k,i})_{TES} = (N_{k,j}^{out})_{TEST}/(N_{k,j})_{TEST},$$

with k representing one of the K discrete bins, i representing the initial selected feature k, and $(\rho_{k,i})_{TEST}$ representing the bin-specific reference violation rate for the $k^{th}$ one of the discrete, non-overlapping bins. In some instances, reference violation module 418 may store each of the bin-specific testing violation rates within the one or more tangible, non-transitory memories of FI computing system 130, and may package the bin-specific testing violation rates into corresponding portions of testing violation rate data 424, e.g., as a vector $((\rho_{1,i})_{TEST}, \ldots, (\rho_{K,i})_{TEST})$, with K representing the total number of discrete bins, and i representing the initial selected feature.

Further, as illustrated in FIG. 4A, executed testing violation module 422 may provision testing violation rate data 424, which includes each of the K bin-specific, testing violation rates to an aggregated violation module 426 of executed Shapley deviation estimation module 406. Executed aggregated violation module 426 may receive testing violation rate data 424, and in some instances, may obtain reference violation rate data 420, which includes each of the K bin-specific, reference violation rates, from the one or more tangible, non-transitory memories of FI computing system 130. Further, in some examples, executed aggregated violation module 426 may compute, for each of the discrete, non-overlapping bins, a difference between a corresponding one of the bin-specific, testing violation rates and a corresponding one of the bin-specific, reference violation rates (e.g., as $((\rho_{k,i})_{TEST}-(\rho_{k,i})_{REF})$, with k representing one of the K discrete bins, i representing the initial selected feature) and may establish an absolute value of the computed difference as an aggregated, bin-specific violation rate for the corresponding one of the discrete, non-overlapping bins.

Executed aggregated violation module 426 may also perform operations that obtain each of the aggregated, bin-specific violation rate (e.g., for corresponding ones of the discrete, non-overlapping bins), that compute an average of the aggregated, bin-specific violation rates (e.g., an arithmetic mean, a geometric mean, etc.), and that establish the computed average of the aggregated, bin-specific violation rates as final violation rate 428 for the initial selected feature of the trained, machine-learning or artificial-intelligence process. As illustrated in FIG. 4A, executed aggregated violation module 426 may package final violation rate 428 for the initial selected feature into a corresponding portion of final violation data 431, along with the feature identifier of the initial selected feature (e.g., illustrated as "FID" in FIG. 4A).

Further, in some examples, executed Shapley deviation estimation module 406 may perform any of the exemplary processes described herein to generate a final violation rate characterizing a deviation of corresponding Shapley values between the initial training and validation date of Jul. 1, 2023, and the corresponding monitoring interval (e.g., the three-month quarter ranging from Oct. 1, 2024, to Dec. 31, 2024) for each additional, or alternate, one of the sequential features specified within composition data 170, and included within the groups of feature identifiers, corresponding Shapley values (e.g., the reference and inferencing Shapley values described herein), and corresponding feature values maintained within each a deviation of corresponding Shapley values between the initial training and validation date of Jul. 1, 2023, and the corresponding monitoring interval (e.g., the three-month quarter ranging from Oct. 1, 2024, to Dec. 31, 2024) of reference explainability tables 402 and testing explainability tables 404. Executed Shapley deviation estimation module 406 may package the final violation rate associated with each additional, or alternate, one of the sequential features of the trained, machine-learning or artificial-intelligence process into a portion of final violation rate 428, along with a corresponding feature identifier.

Upon generation of the final violation rate associated with each additional, or alternate, one of the sequential features of the trained, machine-learning or artificial-intelligence process, and the packaging of the final violation rates and the corresponding feature identifiers into final violation rate data 431, executed aggregated violation module 426 may route final violation rate data 431 to executed exception module 324 of executed explainability monitoring engine 302. In some instances, executed exception module 324 may perform any of the exemplary processes described herein to establish a significance of the estimated deviation in corresponding Shapley values between the initial training and validation date of Jul. 1, 2023, and the corresponding monitoring interval (e.g., the three-month quarter ranging from Oct. 1, 2024, to Dec. 31, 2024) on the predictive accuracy, capability, and stability of the trained, machine-learning or artificial-intelligence process.

Figure 4B:
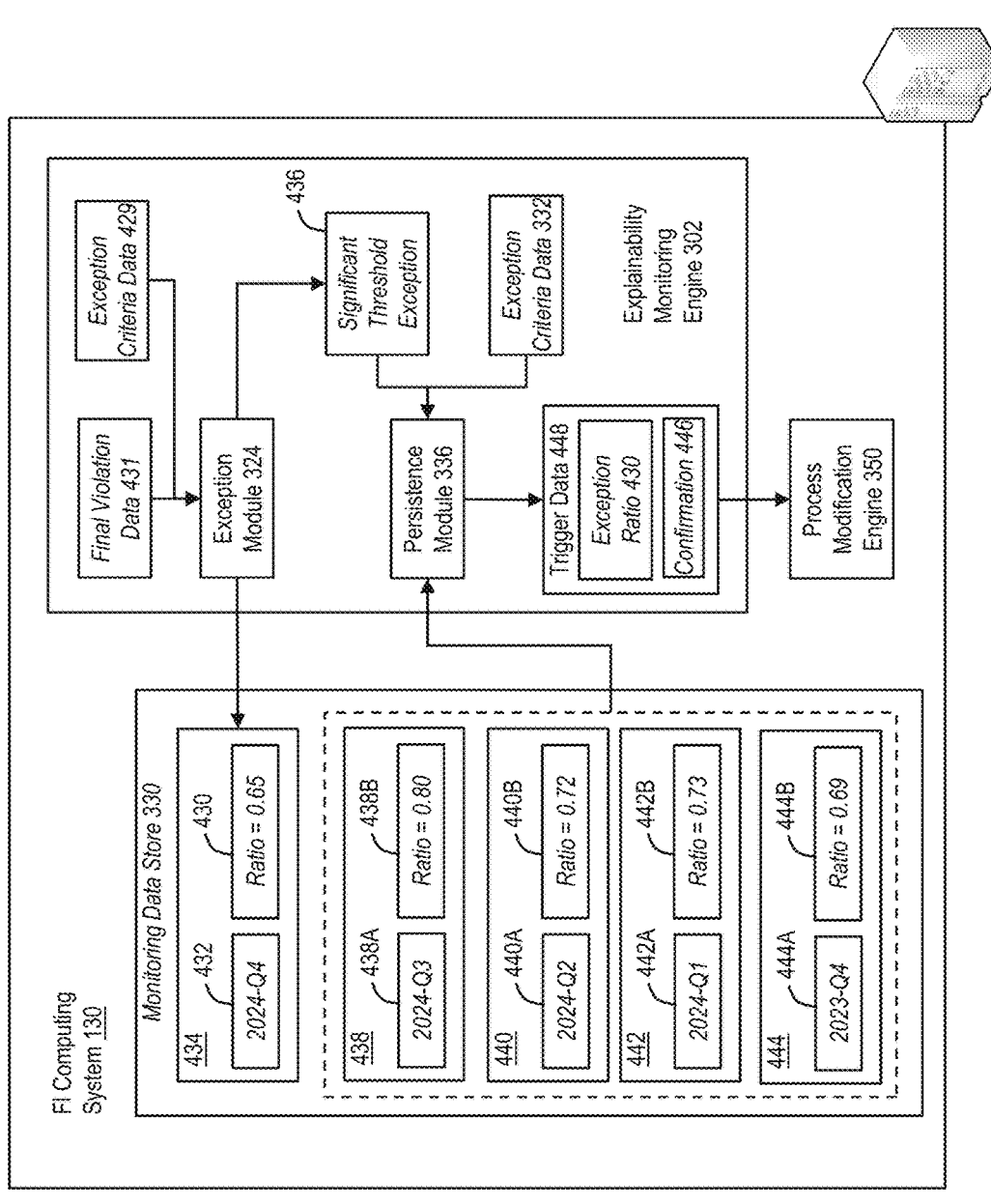

Referring to FIG. 4B, exception module 324 may receive final violation rate data 431, which includes, for each of the features of the trained, machine-learning or artificial-intelligence process, a corresponding feature identifier and a corresponding value of the final violation rate for the feature, such as, but not limited to, feature identifier 428A and final violation rate 428 of the initial selected feature. As described herein, each of the feature-specific final violation rates may range from zero (e.g., indicative of a minimum rate) and unity (e.g., indicative of a maximum rate), and executed exception module 324 may also obtain one or more elements of exception criteria data 429 that specify a threshold rate associated with the feature-specific, final violation rates maintained within final violation rate 428, such as, but not limited to a predetermined, threshold violation rate of 0.03 (e.g., a deviation in 3% of the samples from the initial training and validation date of Jul. 1, 2023, to the corresponding monitoring interval). Further, the one or more elements of exception criteria data 429 may also specify a maximum number of discrete feature values that, consistent with the one or more process validation or monitoring protocols imposed by the financial institution, may be associated with final violation rates that exceed the threshold rate. The maximum number of discrete feature values may be predetermined, or may be dynamically determined by FI computing system 130, and examples of the maximum number of discrete feature values include, but are not limited to, fifteen discrete features or twenty discrete features.

In some instances, and based on the one or more elements of exception criteria data 429, executed exception module 324 may identify a subset of the feature-specific, final violation rates maintained within final violation rate 428 that exceed the threshold rate (e.g., the predetermined, threshold violation rate of 0.03), and may determine a number of discrete features associated with the subset of the feature-specific, final violation rates. Executed exception module 324 may also perform operations that compute an exception ratio 430 of the (i) determined number of discrete features associated with the subset of the feature-specific, final violation rates that exceed the threshold rate and (ii) the maximum number of discrete feature values. Executed exception module 324 perform operations that store computed exception ratio 430 and a unique, alphanumeric interval identifier 432 of the corresponding monitoring interval (e.g., "2024-Q4," which represents the three-month quarter ranging from Oct. 1, 2024, to Dec. 31, 2024) within the one or more tangible, non-transitory memories of FI computing system 130, e.g., within monitoring record 434 of monitoring data store 330.

Executed exception module 324 may also perform operations that obtain, from the one or more elements of exception criteria data 429, additional threshold values, or ranges of threshold values, of the computed exception ratio that characterize, and are associated with, corresponding levels of significance of the estimated Shapley-value deviations between the initial training and validation date of Jul. 1, 2023, and the corresponding monitoring interval (e.g., the three-month quarter ranging from Oct. 1, 2024, to Dec. 31, 2024) for each additional, or alternate, one of the sequential features specified within composition data 170

By way of example, one or more elements of exception criteria data 332 may associate values of the computed exception ratio that fail to exceed a first threshold value (e.g., 0.30, etc.) with a "satisfactory" threshold exception, which indicates a satisfactory and, in some instances, a minimal level of Shapley-value deviation between the initial training and validation date of Jul. 1, 2023, and the corresponding monitoring interval. Further, in some examples, the one or more elements of exception criteria data 332 may associate values of the computed exception ratio between the first threshold value (e.g., 0.30, etc.) and a second threshold value (e.g., 0.50, etc.) with a "moderate" threshold exception, which indicates a moderate level of Shapley-value deviation between the initial training and validation date of Jul. 1, 2023, and the corresponding monitoring interval. As described herein, responsive to the association of the moderate threshold exception to the computed exception ratio, FI computing system 130 may perform operations that generate, and transmit across communications network 120 to a computing system or device operable by an analyst, an alarm message indicating the moderate threshold exception, which when presented by the computing system or device to the analyst via a corresponding computing device, prompts the analyst to investigate a cause of the moderate threshold exception associated with the machine-learning or artificial-intelligence process.

Additionally, in some examples, the one or more elements of exception criteria data 332 may associate values of the computed exception ratio that exceed the second threshold value (e.g., 0.50, etc.) with a "significant" threshold exception, which indicates a significant level of Shapley-value deviation between the initial training and validation date of Jul. 1, 2023, and the corresponding monitoring interval. As described herein, the association of the value of the computed exception ration with the significant threshold exception during the corresponding monitoring interval (e.g., the three-month quarter ranging from Oct. 1, 2024, to Dec. 31, 2024) may trigger a performance, by FI computing system 130, of operations that modify programmatically at least one of (i) a value of a process parameter that characterizes the machine-learning or artificial-intelligence process (e.g., as maintained within process parameter data 168) and/or (ii) a composition of the input dataset associated with the machine-learning or artificial-intelligence process (e.g., as maintained within composition data 170) based on a determination that the significant threshold condition persists during a threshold number of prior monitoring intervals. The threshold number of prior monitoring intervals may, for example, include four consecutive monitoring intervals that precede immediately the corresponding monitoring interval (e.g., four consecutive quarters prior to the three-month quarter ranging from Oct. 1, 2024, to Dec. 31, 2024), and may be specified within the elements of exception criteria data 332.

Referring back to FIG. 3B, computed exception ratio 430 may correspond to a value of 0.65, which indicates that 65% of the maximum number of discrete feature values exceed the threshold rate (e.g., the predetermined, threshold violation rate of 0.03) during the corresponding monitoring interval (e.g., the three-month quarter ranging from Oct. 1, 2024, to Dec. 31, 2024). Based on the elements of exception criteria 332, executed exception module 324 may associate the computed value of 0.65 with a significant threshold exception (e.g., indicating a significant level of significant level of Shapley-value deviation between the initial training and validation date of Jul. 1, 2023, and the corresponding monitoring interval), and may provide, to executed persistence module 336 of executed explainability monitoring engine 302, elements of significant threshold exception data 436 characterizing the occurrence of the significant threshold exception during the corresponding monitoring interval.

Executed persistence module 336 may receive data 436, which confirms the occurrence of the significant threshold exception, and may access the elements of exception criteria data 332 and obtain data characterizing the threshold number of prior monitoring intervals, e.g., the four consecutive monitoring intervals that precede immediately the corresponding monitoring interval. As described herein, the corresponding monitoring interval may include three-month quarter ranging from Oct. 1, 2024, to Dec. 31, 2024, and the four consecutive monitoring intervals that precede immediately the corresponding monitoring interval may include, but are not limited to, a first prior quarter ranging from Jul. 1, 2024, to Sep. 30, 2024, a second prior quarter ranging from Apr. 1, 2024, to Jun. 30, 2024, a third prior quarter ranging from Jan. 1, 2024, to Mar. 31, 2024, and a fourth prior quarter ranging from Oct. 1, 2023, to Dec. 31, 2023. In some instances, executed persistence module 336 may access monitoring data store 330, and may identify monitoring records 438, 440, 442, and 444 associated, respectively, the first, second, third, and fourth prior quarters, e.g., based on corresponding ones of interval identifiers 438A, 440A, 442A, and 444A.

Further, executed persistence module 336 may obtain, from each of data elements 438B, 440B, 442B, and 444B, respective ones of the values of the exception ratio computed during the first, second, third, and fourth prior quarters. In some instances, executed persistence module 336 parse data elements 438B, and determine that the value of the exception ratio computed during the first prior quarter corresponding to 0.80. As described herein, and based on the elements of exception criteria data 332, executed persistence module 336 may associate the computed value of 0.80 during the first prior quarter with a significant threshold exception, indicating a significant level of Shapley-value deviation between the initial training and validation date of Jul. 1, 2023, and the first prior quarter. Executed persistence module 336 may also perform any of the exemplary operations described herein to parse data elements 340B, 342B, and 344B, obtain values of 0.72, 0.73, and 0.69 for the exception ratios computed during respective ones of the second, third, and fourth prior quarters, and associate each of the computed values of 0.72, 0.73, and 0.69 during the third, and fourth prior quarters, respectively, with the significant threshold exception.

Based on the determination that the significant threshold exception not only exists within the corresponding monitoring interval (e.g., the three-month quarter ranging from Oct. 1, 2024, to Dec. 31, 2024), but also persists across the threshold number of prior monitoring intervals (e.g., the first, second, third, and fourth prior quarters), executed persistence module 336 may generate one or more elements of trigger data 448 that include at least the computed value of exception ratio 430, which include the value of 0.65 for the Kendall rank correlation coefficient computed during the corresponding monitoring interval, and data 446 that confirms the existence of the significant threshold exception during the corresponding monitoring interval, and the persistence of that significant threshold exception across the threshold number of prior monitoring intervals. As illustrated in FIG. 4B, executed explainability monitoring engine 302 may provide trigger data 448, including exception ratio 430 and confirmation data 446 as an input to executed process modification engine 350. In some instances, and based on exception ratio 430 and confirmation data 446, executed process modification engine 350 may perform operations, described herein, that modify programmatically at least one of (i) a value of a process parameter that characterizes the machine-learning or artificial-intelligence process (e.g., as maintained within process parameter data 168) and/or (ii) a composition of the input dataset associated with the machine-learning or artificial-intelligence process (e.g., as maintained within composition data 170) in accordance with the existing, and persisting, significant threshold exception.

Figure 5:
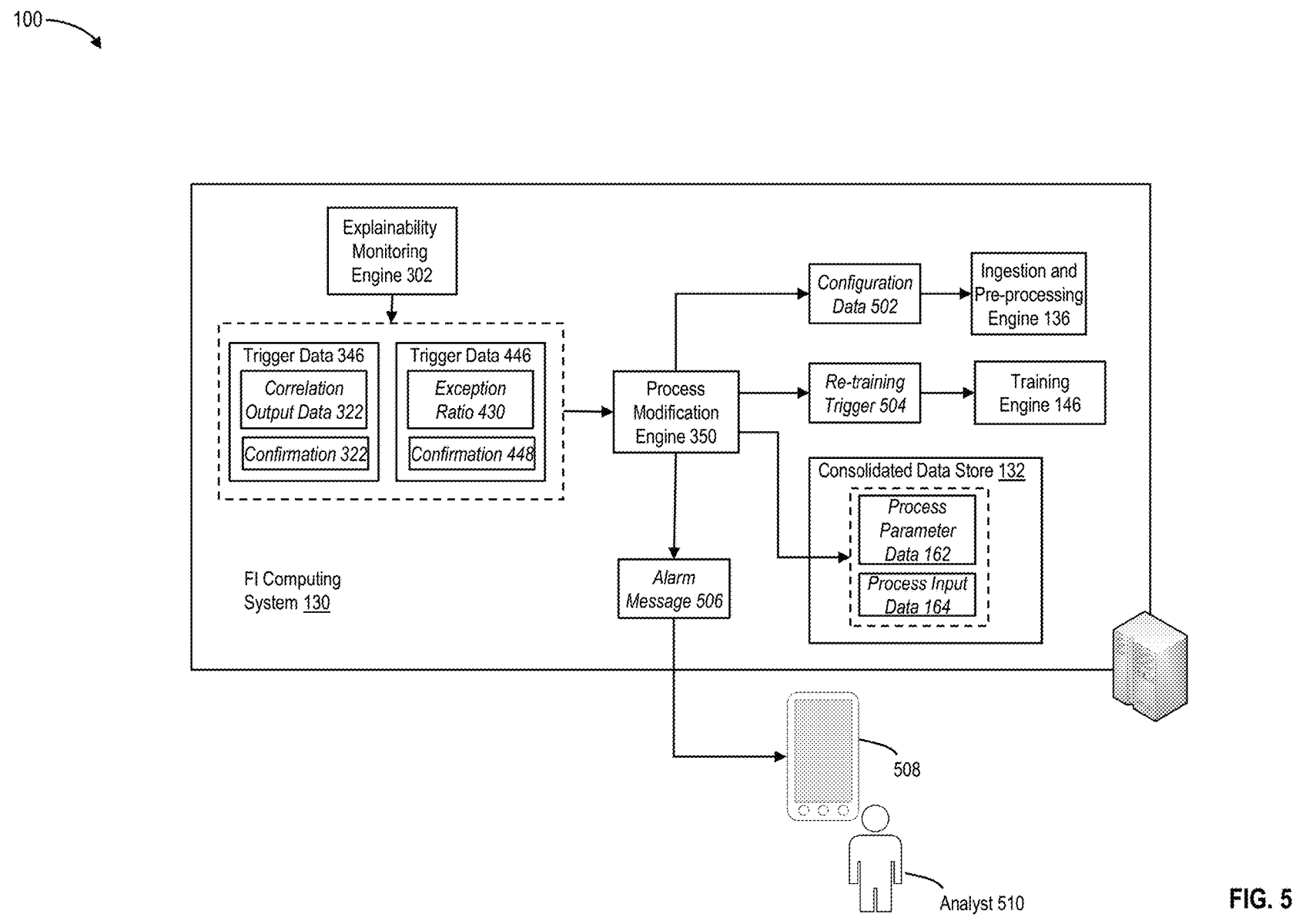

Referring to FIG. 5, executed explainability monitoring engine 302 may perform operations, described herein, to generate, and provision to executed process modification engine 350, elements of trigger data 346 that include correlation output data 322 and confirmation data 325 that confirms the existence of the significant threshold exception during the corresponding monitoring interval, and the persistence of that significant threshold exception across the threshold number of prior monitoring intervals. As described herein, correlation output data 322 may include, among other things the value (e.g., 0.23) of the weighted Kendall rank correlation coefficient associated with the corresponding monitoring interval (e.g., the three-month quarter ranging from Oct. 1, 2024, to Dec. 31, 2024), which indicates the significant level of change in the sequential rankings of the feature identifiers between reference list 316 and a corresponding testing list associated with the first prior quarter.

Further, in some examples, executed explainability monitoring engine 302 may perform also operations, described herein, to generate, and provision to executed process modification engine 350, additional, or alternate elements of trigger data, such as the elements of trigger data 448 that include at least exception ratio 430 (e.g., 0.65) computed during the corresponding monitoring interval, and data 446 that confirms the existence of the significant threshold exception during the corresponding monitoring interval, and the persistence of that significant threshold exception across the threshold number of prior monitoring intervals. As described herein, the significant threshold exception associated with computed exception ratio 430 may be indicative of significant level of Shapley-value deviation between the initial training and validation date of Jul. 1, 2023, and the corresponding monitoring interval (e.g., the three-month quarter ranging from Oct. 1, 2024, to Dec. 31, 2024).

In some instances, executed process modification engine 350 may receive, and process, the elements of trigger data 346 and additionally, or alternatively, the elements of trigger data 448, provisioned by executed explainability monitoring engine 302, based on confirmation data 325 and/or confirmation data 446, process modification engine 350 may confirm the existence of the significant threshold exception associated with the trained, machine-learning or artificial-intelligence process during the corresponding monitoring interval, and the persistence of that significant threshold exception across the threshold number of prior monitoring intervals. For example, and based on confirmation data 325 and/or confirmation data 446, executed process modification engine 350 may determine that the value of the Kendall rank correlation coefficient, or exception ratio 430 computed during the corresponding monitoring interval is inconsistent with one or more of the exception criteria described herein (e.g., within corresponding ones of exception criteria data 332 and 429) and further, that a value of the Kendall rank correlation coefficient, or the value of an exception ratio computed during each of the threshold number of prior monitoring intervals is also is inconsistent with the one or more of the exemption criteria described herein.

Executed process modification engine 350 may, in some instances, perform operations, described herein, that modify programmatically at least one of (i) a value of a process parameter that characterizes the machine-learning or artificial-intelligence process (e.g., as maintained within process parameter data 168) and/or (ii) a composition of the input dataset associated with the machine-learning or artificial-intelligence process (e.g., as maintained within composition data 170) based on a determination that the significant threshold condition persists during a threshold number of prior monitoring intervals. By way of example, in response to the confirmed existence, and persistence, of the significant threshold exception, executed process modification engine 350 may generate one or more elements of configuration data 502 that modify an operation of executed ingestion and pre-processing engine 136, and may provision the generated elements of configuration data 502 to executed ingestion and pre-processing engine 136, e.g., via a programmatic interface (not illustrated in FIG. 5).

In some instances, when processed by executed ingestion and pre-processing engine 136, the elements of configuration data 502 may cause executed ingestion and pre-processing engine 136 to modify a schedule at which FI computing system ingest source data tables from one or more of source systems 102 (e.g., to increase a frequency of data ingestion, etc.), or may cause executed ingestion and pre-processing engine 136 to ingest elements of source data from additional, or alternate, ones of source systems 102, or from additional, or alternate, source data repositories accessible across communications network 120. Further, in some instances, when processed by executed ingestion and pre-processing engine 136, the elements of configuration data 502 may also cause executed ingestion and pre-processing engine 136 to modify an application of one or more data pre-processing operations to elements of source data tables 104 (e.g., by monitoring a value of a scaling parameter associated with one or more scaling operations, by modifying a parameter value of a filtration operation, etc.), or to apply additional, or alternate data processing operation to the elements of source data tables 104. Through an performance of one or more of these programmatic modification operations, executed process modification engine 350 may modify a composition of the ingested source data tables maintained within aggregated data store 135, and a composition of the consolidated data records maintained within consolidated data store 132, and as such, may modify a composition of the data sets that support the training and validation of the machine-learning or artificial-intelligence process, and the inferencing operations involving the trained, machine-learning or artificial-intelligence process.

Further, and based on the determination that the significant threshold condition persists during a threshold number of prior monitoring intervals, executed process modification engine 350 may also perform operations that trigger programmatically a further adaptive training and validation of the machine-learning or artificial-intelligence process using any of the exemplary processes described herein. For example, executed process modification engine 350 may access consolidated data store 132, and may perform operations that either delete one or more of process parameter data 168 or composition data 170 from consolidated data store 132, or that modify portions of process parameter data 168 or composition data 170, which render process parameter data 168 or composition data 170 incapable to supporting an application of the trained, machine-learning or artificial-intelligence process to corresponding input datasets. Further, as illustrated in FIG. 5, executed process modification engine 350 may also generate data, e.g., a re-training trigger 504, that triggers, or requests, a further adaptive training of the machine-learning or artificial-intelligence process by executed training engine 146, and process modification engine 350 may provision generated re-training trigger 504 to executed training engine 146. In some instances, when processed by executed training engine 146, re-training trigger 504 may cause executed training engine 146 to perform any of the exemplary processes described herein to further train adaptively the machine-learning or artificial-intelligence process, and generate additional elements of process parameter data and composition data that characterize the further trained, and validated machine-learning or artificial-intelligence process and a corresponding input dataset.

Further, in some instances, executed process modification engine 350 may also perform operations that generate an alarm message 506 indicative of the existence, and persistence, of the significant threshold exception involving the trained, machine-learning or artificial-intelligence process, and transmit alarm message 506 across communications network 120 to a computing system or device 508 operable by an analyst 510 (or other representative of the financial institution). Alarm message 506 may, for example, include one or more of confirmation data 325 or 448, which confirms the existence, and persistence, of the significant threshold exception involving the trained, machine-learning or artificial-intelligence process, one or more of correlation output data 322 or exception ratio 430, and additionally, or alternatively, one or more of reference explainability data 174, explainability data 236, or additional explainability data 311A.

FIG. 6 is a flowchart of an exemplary process 600 for dynamically monitoring an existence, and a persistence, of temporal variations in an explainability of a trained, machine-learning or artificial-intelligence processes within a distributed computing environment. As described herein, the machine-learning or artificial intelligence process may include an ensemble or decision-tree process, such as a gradient-boosted decision-tree process (e.g., the XGBoost model), which may be trained adaptively to predict a likelihood of an occurrence of a target event during a current, or a future, temporal interval using training datasets associated with a first prior temporal interval (e.g., the training interval, as described herein), and using validation datasets associated with a second, and distinct, prior temporal interval (e.g., the validation interval, as described herein). In some examples, one or more computing systems associated with a financial institution, such as one or more of the distributed components of FI computing system 130, may perform one or more of the steps of exemplary process 600, as described herein.

Referring to FIG. 6, FI computing system 130 may perform any of the exemplary processes described herein to obtain elements of first explainability data characterizing an explainability of a machine-learning or artificial-intelligence process during a first temporal interval (e.g., in step 602 of FIG. 6). By way of example, and as described herein, the elements of first data may include, among other things, elements of reference explainability data (e.g., reference explainability data 174 of FIG. 1C) associated with an initial, adaptive training and validation of the machine-learning or artificial-intelligence process leveraging in-time training and validation datasets obtained or derived from temporally distinct subsets of ingested and processed source data (e.g., temporally distinct subsets of consolidated data records 138 of FIGS. 1A and 1B). Additionally, or alternatively, the elements of reference explainability data may be associated with a subsequent out of time validation process that validates the trained, machine-learning or artificial-intelligence process using additional, out-of-time validation datasets obtained or derived from additional, and temporally distinct, subsets of ingested and processed source data.

In some instances, the elements of reference explainability data may include discrete sets of associated pairs of feature identifiers and corresponding reference Shapley values, which may be generated by FI computing system 130 through the initial, adaptive training and validation of the machine learning or intelligence process using each of a plurality of in-time validation datasets (e.g., validation datasets 164 of FIG. 1C, etc.) and additionally, or alternatively, through the subsequent validation of the machine learning or intelligence process using each of a plurality of out-of-time validation datasets. Further, the elements of reference explainability data may be associated with a corresponding reference date, which, among other things, specify an initial training and validate date within the first temporal interval (e.g., as specified by initial training and validation date 182 of FIG. 1C), and as described herein, the elements of reference explainability data may establish a "baseline"

explainability for the trained, machine-learning or artificial intelligence process on the reference date. In some instances, and in addition to the elements of reference explainability data, FI computing system 130 may also perform operations in step 602 that obtain corresponding ones of the validation datasets associated with the elements of reference explainability data (e.g., validation datasets 164 of FIG. 1C), which include sequentially ordered feature values associated with corresponding ones of the pairs of feature identifiers and corresponding reference Shapley values, and/or that obtain elements of temporal data characterizing the reference date (e.g., initial training and validation date 182 of FIG. 1C).

Referring back to FIG. 6, FI computing system 130 may obtain elements of scheduling data that specify a monitoring schedule associated with the trained, machine-earning or artificial-intelligence process (e.g., in step 604 of FIG. 6). As described herein, and through a performance of one of more steps of exemplary process 600, FI computing system dynamically monitor a temporal evolution in one or more metric values characterizing an explainability of a trained, machine-earning or artificial-intelligence process between a reference date (e.g., a date of initial process training and validation, etc.) and each of a plurality of subsequent, and successive, monitoring intervals of predetermined duration. Examples of the successive, monitoring intervals of predetermined duration may include, but are not limited to, a weekly interval, a monthly interval, or a quarterly interval (e.g., having a duration of three months), and the elements of scheduling data may include the predetermined duration of the successive monitoring intervals, and may further include, among other things, initiation data characterizing a predetermined date (or time) at which FI computing system 130 initiates a performance of one or more of the exemplary, dynamic monitoring processes described herein within corresponding ones of the successive monitoring intervals.

In accordance with the scheduling data, FI computing system 130 may also perform any of the exemplary processes described herein to obtain elements of second explainability data characterizing the machine-learning or artificial-intelligence process during a second temporal interval subsequent to the first temporal interval (e.g., in step 606 of FIG. 6). By way of example, the second temporal interval may represent a corresponding one of the successive monitoring intervals of predetermined duration specified by the elements of scheduling data, such as, but not limited to, within the three-month quarter ranging from Oct. 1, 2024, to Dec. 31, 2024, described herein, and FI computing system 130 may initiate the performance of one or more of the exemplary, dynamic monitoring processes described herein in accordance with the predetermine date specified within the elements of scheduling data (e.g., Dec. 31, 2024, disposed within the three-month, monitoring quarter ranging from Oct. 1, 2024, to Dec. 31, 2024).

The elements of second explainability data may include elements of additional explainability data generated through applications of the trained, machine learning or intelligence process to input datasets on inferencing dates subsequent to the reference date and disposed within the corresponding one of the successive monitoring intervals, such as the three-month quarter ranging from Oct. 1, 2024, to Dec. 31, 2024, as described herein. The elements of additional explainability data (e.g., explainability data 236 and/or additional explainability data 311A of FIG. 3A) may include discrete sets of associated pairs of feature identifiers and corresponding inferencing Shapley values, which may be generated by FI computing system 130 during the application of the trained machine learning or intelligence process to corresponding input datasets during the corresponding one of the successive monitoring intervals (e.g., input datasets 218 and 311B of FIG. 3A, respectively). In some instances, and in addition to the elements of additional explainability data, FI computing system 130 may also perform operations in step 606 that obtain corresponding ones of the input datasets associated with the elements of additional explainability data (e.g., input datasets 218 and 311B of FIG. 3A, respectively), which include sequentially ordered feature values associated with corresponding ones of the pairs of feature identifiers and corresponding inferencing Shapley values, and/or that obtain elements of temporal data characterizing each of the inferencing dates (e.g., inferencing dates 242 and 311C of FIG. 3A).

Based on at least the elements of first explainability data (e.g., the reference explainability data associated with the reference date, as described herein) and the elements of second explainability data (e.g., the additional explainability data associated with corresponding inferencing dates, as described herein), FI computing system 130 may perform any of the exemplary processes described herein to determine a value of a metric that characterizes a variation in the explainability of the machine-learning or artificial-intelligence process between the first and second temporal intervals (e.g., in step 608 of FIG. 6). By way of example, as described herein, the metric value may characterize the variation in the explainability of the machine-learning or artificial-intelligence process between the reference date (e.g., the initial training and validation date, etc.) and the corresponding one of the successive monitoring intervals, e.g., the three-month quarter ranging from Oct. 1, 2024, to Dec. 31, 2024.

Figure 7:
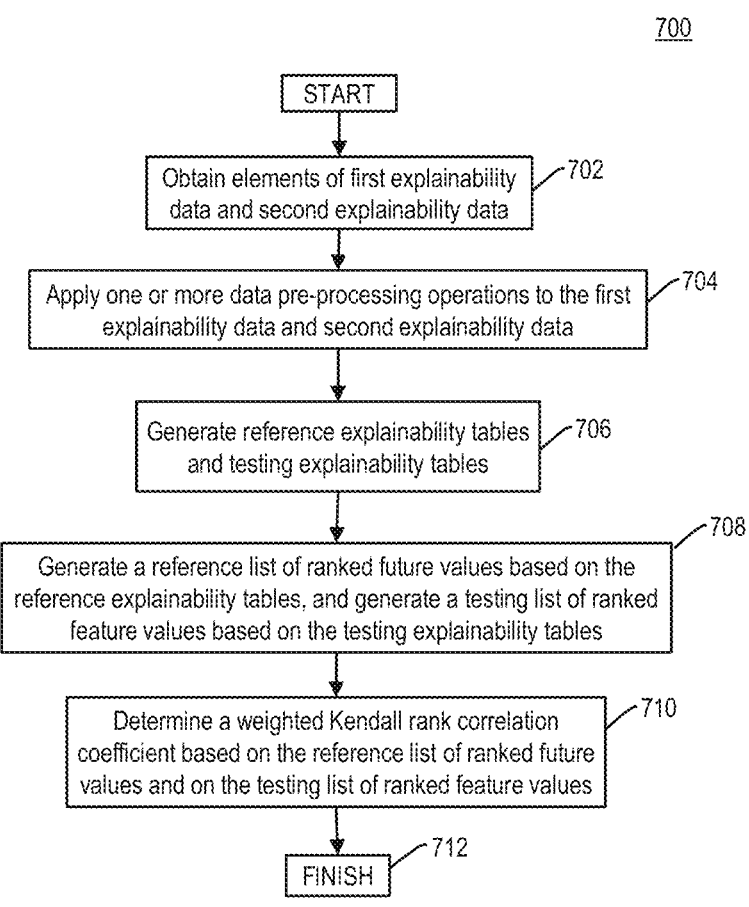
FIGS. 7 and 8 are flowcharts of exemplary processes for determine a value of a metric that characterizes a variation in the explainability of the machine-learning or artificial-intelligence process, in accordance with some embodiments.

As described herein, the elements of reference explainability data may characterize, via the reference Shapley values, a relative contribution of each of features of the machine-learning or artificial-intelligence process to the predictive output at the reference date, and as such, the reference Shapley values may facilitate a "baseline" ranking of features of the trained machine-learning or artificial-intelligence in accordance with their respective, relative contributions. Further, a stable machine-learning or artificial-intelligence process may maintain the baseline relationship between the relationship between a magnitude of corresponding ones of the feature values and a magnitude of the predictive output, and the baseline ranking of the features of the trained machine-learning or artificial-intelligence in accordance, through multiple inferencing operations performed months, or years, subsequent to the initial training and validation date, such as, but not limited to, those characterized by the elements of additional explainability data associated with the inferencing dates disposed within the corresponding one of the successive monitoring intervals (e.g., the three-month quarter ranging from Oct. 1, 2024, to Dec. 31, 2024). FIG. 7 is a flowchart of an exemplary process 700 for determining a magnitude of a metric value, such as a Kendall rank correlation coefficient, that characterizes changes in the rankings of the features of the trained, machine-learning or artificial-intelligence process between the reference date and the corresponding one of the successive monitoring intervals, and FI computing system 130 may perform one or more of the steps of exemplary process 700.

Figure 8:
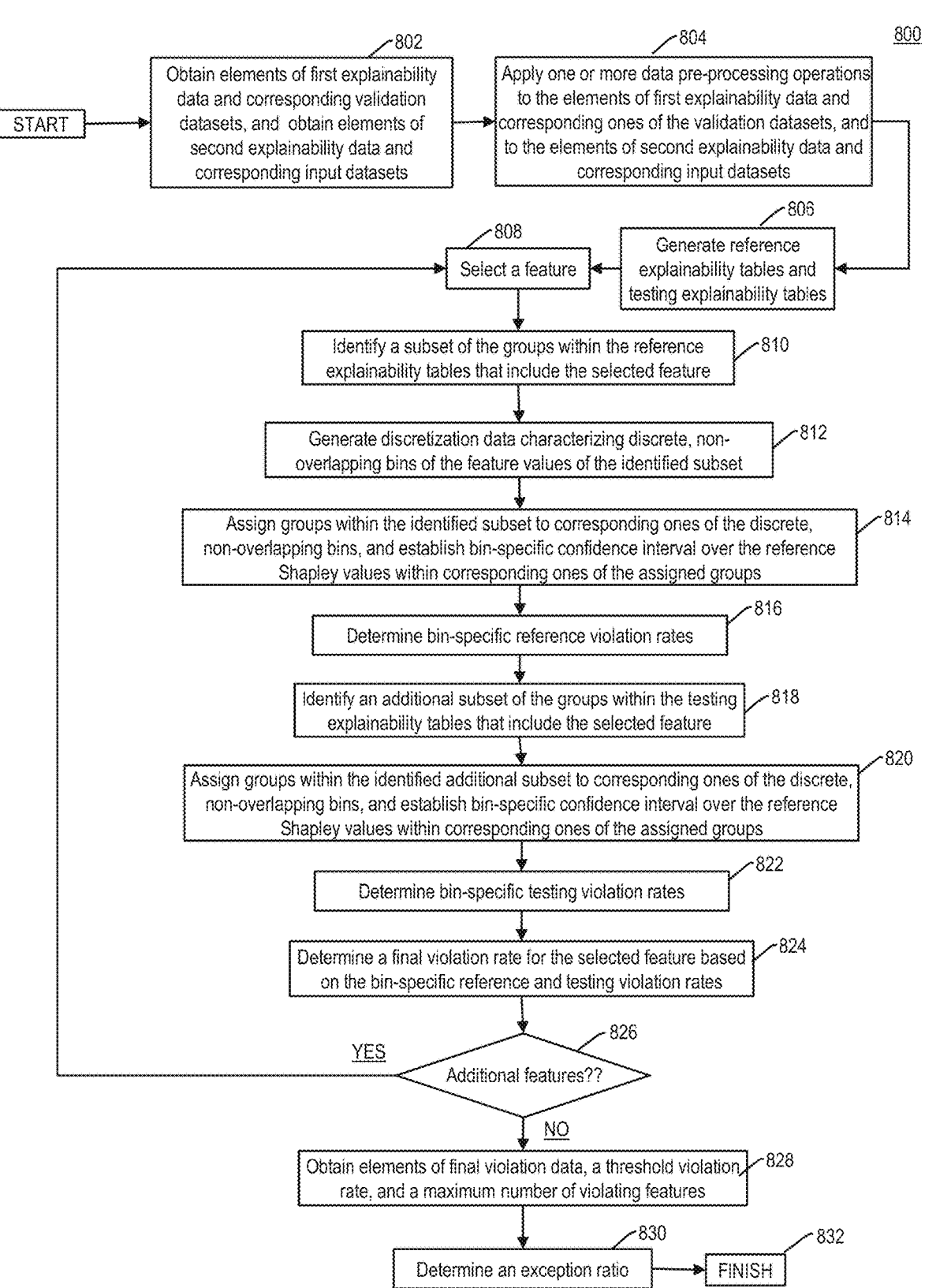

Further, the elements of reference explainability data, and corresponding ones of the validation datasets, may also characterize, for each of the features, a baseline relationship between a magnitude of a corresponding feature value and magnitude of a corresponding one of the reference Shapley values at the reference date (e.g., the initial training and validation date). As described herein, a stable machine-learning or artificial-intelligence process may maintain the baseline relationship between a magnitude of a corresponding feature value and magnitude of a corresponding one of the reference Shapley values through multiple inferencing operations performed months, or years, subsequent to the initial training and validation date, such as, but not limited to, those characterized by the elements of additional explainability data associated with the inferencing dates disposed within the corresponding one of the successive monitoring intervals (e.g., the three-month quarter ranging from Oct. 1, 2024, to Dec. 31, 2024). FIG. 8 is a flowchart of an exemplary process 800 for determining a magnitude of a metric value characterizing deviations from the baseline relationship between the magnitude of feature values and magnitude of corresponding ones of the reference Shapley values between the reference date and the corresponding one of the successive monitoring intervals, and FI computing system 130 may perform one or more of the steps of exemplary process 800.

Referring to FIG. 7, FI computing system 130 may perform any of the exemplary processes described herein to obtain the elements of first explainability data and the elements of second explainability data (e.g., in step 702 of FIG. 7). As described herein, the elements of first explainability data may include, among other things, elements of reference explainability data (e.g., reference explainability data 174 of FIG. 1C) associated with an initial, adaptive training and validation of the machine-learning or artificial-intelligence process and additionally, or alternatively, with a subsequent out of time validation. Further, the elements of reference explainability data may include discrete sets of associated pairs of feature identifiers and corresponding reference Shapley values, which may be generated by FI computing system 130 through the initial, adaptive training and validation of the machine learning or intelligence process using each of a plurality of in-time validation datasets (e.g., validation datasets 164 of FIG. 1C, etc.) and additionally, or alternatively, through the subsequent validation of the machine learning or intelligence process using each of a plurality of out-of-time validation datasets.

Further, and as described herein, the elements of second explainability data may include elements of additional explainability data generated through applications of the trained, machine learning or intelligence process to input datasets on inferencing dates subsequent to the reference date and disposed within a corresponding one of the successive monitoring intervals, such as the three-month quarter ranging from Oct. 1, 2024, to Dec. 31, 2024, as described herein. The elements of additional explainability data (e.g., explainability data 236 and/or additional explainability data 311A of FIG. 3A) may include discrete sets of associated pairs of feature identifiers and corresponding inferencing Shapley values, which may be generated by FI computing system 130 during the application of the trained machine learning or intelligence process to corresponding input datasets during the corresponding one of the successive monitoring intervals (e.g., input datasets 218 and 311B of FIG. 3A, respectively).

Referring back to FIG. 7, FI computing system 130 may also perform operations, described herein, that apply one or more data pre-processing operations to the elements of first explainability data and the elements of second explainability data (e.g., in step 704 of FIG. 7). Based on the application of the data pre-processing operations to the elements of first explainability data, FI computing system 130 may perform any of the exemplary processes described herein to generate one or more reference explainability tables that associate each of the feature identifiers (e.g., of the feature of the trained, machine-learning or artificial-intelligence process) with corresponding ones of the reference Shapley values derived through the adaptive, in-time training and validation of the machine learning or intelligence process, or through the subsequent, out-of-validation of the machine learning or intelligence process, at the reference date (e.g., in step 706 of FIG. 7). Further, and based on the application of the data pre-processing operations to the elements of second explainability data, FI computing system 130 may perform any of the exemplary processes described herein to generate one or more testing explainability tables that associate each of the feature identifiers (e.g., of the features of the trained, machine-learning or artificial-intelligence process) with corresponding ones of the inferencing Shapley values derived through the through the application of the trained machine learning or intelligence process to input datasets on the inferencing dates disposed subsequent to the reference date (e.g., also in step 706 of FIG. 7).

In some instances, and based on the reference explainability tables and on the testing explainability tables, FI computing system 130 may perform any of the exemplary processes described herein to generate a reference list of ranked feature identifiers (e.g., of the features of the trained, machine-learning or artificial-intelligence process) ranked in a descending order of the corresponding ones of the average, absolute reference Shapley values, and to generate a testing list of ranked feature identifiers (e.g., of the features of the trained, machine-learning or artificial-intelligence process) ranked in a descending order of the corresponding ones of the average, absolute inferencing Shapley values (e.g., in step 708 of FIG. 7).

Further, and as described herein, FI computing system 130 may also perform operations that apply one or more statistical processes to corresponding portions of the reference list of ranked feature identifiers (e.g., associated with the reference date) and the testing list of ranked feature identifiers (e.g., associated with the corresponding one of the successive monitoring intervals, such as the three-month quarter ranging from Oct. 1, 2024, to Dec. 31, 2024). In some instances, based on the application of the one or more statistical processes to corresponding portions of the reference list of ranked feature identifiers and the testing list of ranked feature identifiers, FI computing system 130 may perform any of the exemplary processes described herein to characterize a temporal variation in the relative importance of the features to the predictive output of the trained, machine-learning or artificial-intelligence process, or in the relationship between a magnitude of corresponding ones of the feature values and a magnitude of the predictive output, between the reference date and the corresponding one of the successive monitoring intervals.

By way of example, FI computing system 130 may perform any of the exemplary processes described herein to determine a value of a weighted Kendall rank correlation coefficient (e.g., a weighted Kendall's coefficient) between ranked reference list of the feature identifiers and the ranked testing list of the feature identifiers using the average, absolute reference Shapley values associated with corresponding ones of the ranked feature (e.g., in step 710 of FIG. 7). As described herein, the value of weighted Kendall rank correlation coefficient may range from zero to unity, with a value of zero indicative of a minimum correlation between the sequential rankings of the feature identifiers in the ranked reference and testing lists (and a maximum amount of change between these sequential rankings), and with a value of unity indicative of a maximum correlation between the sequential rankings of the feature identifiers in ranked reference and testing lists. Exemplary process 700 is then complete in step 712.

Referring to FIG. 8, FI computing system 130 may perform any of the exemplary processes described herein to obtain elements of first explainability data and corresponding validation datasets, and to obtain elements of second explainability data and corresponding input datasets (e.g., in step 802 of FIG. 8). As described herein, the elements of first explainability data may include, among other things, elements of reference explainability data (e.g., reference explainability data 174 of FIG. 1C) associated with an initial, adaptive training and validation of the machine-learning or artificial-intelligence process and additionally, or alternatively, with a subsequent out of time validation. Further, each of the validation datasets may include a discrete set of values of corresponding features of the machine-learning or artificial-intelligence process (e.g., a feature vector) having a composition and a sequential order consistent with the elements of composition data 170, and the elements of reference explainability data may include discrete sets of associated pairs of feature identifiers and corresponding reference Shapley values, which may be generated by FI computing system 130 through the initial, adaptive training and validation of the machine learning or intelligence process using the obtained validation datasets (e.g., validation datasets 164 of FIG. 1C, etc.) and additionally, or alternatively, through the subsequent validation of the machine learning or intelligence process using each of the obtained validation datasets.

Further, and as described herein, each of the input datasets (e.g., input datasets 218 and additional input datasets 311B of FIG. 3A) may include a discrete set of values of corresponding features of the machine learning or intelligence process (e.g., a feature vector) having a composition and a sequential order consistent with the elements of composition data 170, and the elements of second explainability data may include elements of additional explainability data generated through applications of the trained, machine learning or intelligence process to corresponding ones of the input datasets on inferencing dates subsequent to the reference date and disposed within a corresponding one of the successive monitoring intervals, such as the three-month quarter ranging from Oct. 1, 2024, to Dec. 31, 2024, as described herein. The elements of additional explainability data (e.g., explainability data 236 and/or additional explainability data 311A of FIG. 3A) may include discrete sets of associated pairs of feature identifiers and corresponding inferencing Shapley values, which may be generated by FI computing system 130 during the application of the trained, machine learning or intelligence process to corresponding ones of the input datasets during the corresponding one of the successive monitoring intervals.

Referring back to FIG. 8, FI computing system 130 may perform any of the exemplary processes described herein to apply one or more data pre-processing operations to the elements of first explainability data and corresponding ones of the validation datasets, and to the elements of second explainability data and corresponding input datasets (e.g., in step 804 of FIG. 8). In some instances, and based on the application of the one or more data pre-processing operations to the elements of first explainability data and corresponding ones of the validation datasets, FI computing system 130 may perform any of the exemplary processes described herein to generate one or more reference explainability tables that maintain groups of associated groups of feature identifiers, corresponding reference Shapley values obtained from the elements of first explainability data, and corresponding feature values obtained from corresponding ones of the validation datasets (e.g., in step 806 of FIG. 8). Further, and based on the application of the one or more data pre-processing operations to the elements of second explainability data and corresponding ones of the input datasets, FI computing system 130 may perform any of the exemplary processes described herein to generate one or more testing explainability tables that maintain groups of associated groups of feature identifiers, corresponding inferencing Shapley values obtained from the elements of second explainability data, and corresponding feature values obtained from corresponding ones of the input datasets (e.g., also in step 806 of FIG. 8).

In some instances, FI computing system 130 may perform any of the exemplary processes described herein to select an initial one of the features of the trained, machine learning or intelligence process (e.g., in step 808 of FIG. 8), and to identify, within the reference explainability tables, a subset of the groups of feature identifiers, corresponding reference Shapley values, and corresponding feature values that include the feature identifier of the selected feature (e.g., in step 810 of FIG. 8). FI computing system 130 may also perform any of the exemplary processes described herein to discretize a range of feature values within the identified subset of the groups into a plurality of discrete, non-overlapping bins, and generate discretization data characterizing each of the discrete, non-overlapping bins, including the feature-value boundaries of each of the discrete, non-overlapping bins (e.g., in step 812 of FIG. 8).

Based on the discretization data, FI computing system 130 may also perform any of the exemplary processes described herein to assign each of the groups of feature identifiers, reference Shapley values, and feature values within the identified subset (e.g., that include the feature identifier of the selected feature) to a corresponding one of the discrete, non-overlapping bins based on the feature values of the groups and the feature-value boundaries of each of the discrete, non-overlapping bins (e.g., in step 814 of FIG. 8). FI computing system 130 may also perform any of the exemplary processes described herein to establish, for each of the discrete, non-overlapping bins, a bin-specific confidence interval over the reference Shapley values within corresponding ones of the assigned groups (e.g., also in step 814 of FIG. 8). For each of the discrete, non-overlapping bins FI computing system 130 may also perform any of the exemplary processes described herein to determine a bin-specific reference violation rate (e.g., in step 816 of FIG. 8). By way of example, FI computing system 130 may compute the bin-specific reference violation rate for each of the discrete, non-overlapping bins as a ratio of (i) a number of assigned groups having reference Shapley values disposed outside of the bin-specific confidence interval for the non-overlapping bin and (ii) the total number of groups assigned to the non-overlapping bin.

In some instances, FI computing system 130 may also perform any of the exemplary processes described herein to identify, within the testing explainability tables, an additional subset of the groups of feature identifiers, corresponding inferencing Shapley values, and corresponding feature values that include the feature identifier of the selected feature (e.g., in step 818 of FIG. 8). Further, and based on the discretization data, FI computing system 130 may also perform any of the exemplary processes described herein to assign each of the groups of feature identifiers, inferencing Shapley values, and feature values within the identified additional subset (e.g., that include the feature identifier of the selected feature) to a corresponding one of the discrete, non-overlapping bins (e.g., in step 820 of FIG. 8). FI computing system 130 may also perform any of the exemplary processes described herein to establish, for each of the discrete, non-overlapping bins, a bin-specific confidence interval over the inference Shapley values within corresponding ones of the assigned groups of the additional subset (e.g., also in step 820 of FIG. 8).

For each of the discrete, non-overlapping bins, FI computing system 130 may also perform any of the exemplary processes described herein to determine a bin-specific testing violation rate (e.g., in step 822 of FIG. 8). By way of example, FI computing system 130 may compute the bin-specific testing violation rate for each of the discrete, non-overlapping bins as a ratio of (i) a number of assigned groups having inferencing Shapley values disposed outside of the bin-specific confidence interval for the non-overlapping bin and (ii) the total number of groups assigned to the non-overlapping bin. FI computing system 130 may also perform any of the exemplary processes described herein to determine, for each of the discrete, non-overlapping bins, an aggregated, bin-specific violation rate based on an absolute value of a computed difference between a corresponding one of the bin specific, testing violation rates and a corresponding one of the bin-specific, reference violation rates (e.g., in step 824 of FIG. 8). Further, FI computing system 130 may perform any of the exemplary processes described herein to compute an average of the aggregated, bin specific violation rates across the discrete, non-overlapping bins, and that establish the computed average of the aggregated, bin specific violation rates as final violation rate for the selected feature of the trained, machine-learning or artificial-intelligence process (e.g., also in step 824 of FIG. 8).

FI computing system 130 may also determine whether any additional features of the trained machine-learning or artificial-intelligence process await processing (e.g., in step 826). If FI computing system 130 were to determine the one or more additional features await processing (e.g., step 826; YES), exemplary process 800 may pass back to step 808, and FI computing system 130 may perform any of the exemplary processes described herein to select one of the additional features.

Alternatively, if FI computing system 130 were to determine the no additional features await processing (e.g., step 826; NO), FI computing system 130 may perform operations, described herein, to obtain elements of final violation data that include, for each of the features of the trained, machine-learning or artificial-intelligence process, a corresponding feature identifier and a corresponding value of the final violation rate for the feature (e.g., in step 828 of FIG. 8). As described herein, each of the feature-specific final violation rates may range from zero (e.g., indicative of a minimum rate) to unity (e.g., indicative of a maximum rate), and FI computing system 130 may also perform operations, described herein, that obtain threshold violation rate associated with the feature-specific, final violation rates and a maximum number of discrete feature values that, consistent with the one or more process validation or monitoring protocols imposed by the financial institution, may be associated with final violation rates that exceed the threshold rate (e.g., also in step 830 of FIG. 8).

Based on the elements of final violation data, the threshold violation rate, and the maximum feature number, FI computing system 130 may perform any of the exemplary processes described herein to determine a value of an exception metric characterizing deviations from the baseline relationship between the magnitude of feature values and magnitude of corresponding ones of the reference Shapley values between the reference date and the corresponding one of the successive monitoring intervals (e.g., in step 830 of FIG. 8). By way of example, in step 830, FI computing system 130 may perform operations that identify a subset of the feature-specific, final violation rates maintained within the elements of final violation rate that exceed the threshold rate, and may determine a number of discrete features associated with the subset of the feature-specific, final violation rates. FI computing system 130 may perform operations may also perform operations that compute the exception ratio as a ratio of (i) the determined number of discrete features associated with the subset of the feature-specific, final violation rates that exceed the threshold rate and (ii) the maximum number of discrete feature values. Exemplary process 800 is then complete in step 832.

Referring back to FIG. 6, FI computing system 130 may perform any of the exemplary processes described herein to determine the metric value characterizing the variation in the explainability of the machine-learning or artificial-intelligence process between the first and second temporal intervals (e.g., in step 608 of FIG. 6). By way of example, as described herein, the metric value may, for example, include a value of a Kendall rank correlation coefficient that characterizes changes in the rankings of the features of the trained, machine-learning or artificial-intelligence process between the first temporal interval (e.g., the reference date) and the second temporal interval, e.g., the corresponding one of the successive monitoring intervals (e.g., determined using exemplary process 700 of FIG. 7). Additionally, in some examples, the metric value may include a value of an exception ratio characterizing deviations from the baseline relationship between the magnitude of feature values and the magnitude of corresponding ones of the reference Shapley values between the first temporal interval (e.g., the reference date) and the second temporal interval, e.g., the corresponding one of the successive monitoring intervals (e.g., determined using exemplary process 800 of FIG. 8). Further, as illustrated in FIG. 6, FI computing system 130 may also perform any of the exemplary processes described herein to obtain elements of metric-specific exception criteria data, which identify and characterize one or more metric-specific exception criteria for the trained machine-learning or artificial intelligence process (e.g., in step 610 of FIG. 6).

By way of example, the elements of metric-specific exception criteria data that may specify, for the specify, for metric values that include the Kendall rank correlation coefficient, metric-specific threshold values, or ranges of metric-specific threshold values, of the weighted Kendall rank correlation coefficient, which characterize, and are associated with, corresponding levels of significance of the corresponding, measured changes of the sequential rankings of the feature identifiers between the first and second temporal intervals. For instance, one or more elements of the metric-specific exception criteria data may associate values of weighted Kendall rank correlation coefficient that exceed a first, metric-specific threshold value (e.g., 0.70, etc.) with a "satisfactory" threshold exception, which indicates a satisfactory and in some instances, a minimal level of change in the sequential rankings of the feature identifiers between the first and second temporal intervals. Further, in some examples, the one or more elements of that exception criteria data may associate values of weighted Kendall rank correlation coefficient disposed between a second, metric specific threshold value (e.g., 0.50, etc.) and the first, metric-specific threshold value (e.g., 0.70, etc.) with a "moderate" threshold exception, which indicates a moderate level of change in the sequential rankings of the feature identifiers between the first and second temporal identifiers. In some examples, the one or more elements of metric-specific exception criteria data may associate values of weighted Kendall rank correlation coefficient that fail to exceed the second, metric-specific threshold value (e.g., 0.30, etc.) with a "significant" threshold exception, which indicates a significant level of change in the sequential rankings of the feature identifiers between the first and second temporal intervals.

Further, in some examples, the one or more elements of metric-specific exception criteria data may associate values of the computed exception ratio that fail to exceed a first, metric-specific threshold value (e.g., 0.30, etc.) with a "satisfactory" threshold exception, which indicates a satisfactory and, in some instances, a minimal level of Shapley-value deviation between the first and second temporal intervals. Further, in some examples, the one or more elements of metric-specific exception criteria data may associate values of the computed exception ratio between the first, metric-specific threshold value (e.g., 0.30, etc.) and a second, metric-specific threshold value (e.g., 0.50, etc.) with a "moderate" threshold exception, which indicates a moderate level of Shapley-value deviation between the first and second temporal intervals. Additionally, and by way of example, the one or more elements of metric-specific exception criteria data may associate values of the computed exception ratio that exceed the second, metric-specific threshold value (e.g., 0.50, etc.) with a "significant" threshold exception.

Referring back to FIG. 6, FI computing system 130 may perform any of the exemplary processes described herein to associate the computed metric value with a corresponding one of satisfactory, moderate, or significant threshold exceptions during the second temporal interval based on a determined consistency, or a determined inconsistency, between the computed metric value and one or more of the metric-specific exception criteria specified within the elements of metric-specific exception criteria data (e.g., in step 612 of FIG. 6). In some instances, FI computing system 130 may perform operations, described herein, that determine whether the metric value is associated with a significant threshold exception during the second temporal interval (e.g., in step 614 of FIG. 6). If, for example, FI computing system 130 were to associate the metric value with either a moderate or satisfactory exception during the second temporal interval, and not the significant threshold exception (e.g., step 614; NO), FI computing system 130 may perform one or more operations consistent with the associated moderate or satisfactory threshold exception (e.g., in step 616 of FIG. 6).

By way of example, and responsive to the association of the metric value with the moderate threshold exception during the second temporal interval, FI computing system 130 may perform operations that generate, and transmit across communications network 120 to a computing system or device 508 operable by analyst 510, an alert message indicating the moderate threshold exception, which when presented by computing system or device 508 to analyst 510 via a corresponding computing device, prompts analyst 510 to investigate a cause of the moderate threshold exception associated with the machine-learning or artificial-intelligence process. Further, in some instances, FI computing system 130 may take no action in response to the association of the metric value with the satisfactory threshold exception during the second temporal interval. Exemplary process 600 is then complete in step 618.

Alternatively, if FI computing system 130 were to associate the metric value with either the significant threshold exception during the second temporal interval, and not the (e.g., step 614; YES), FI computing system 130 may perform any of the exemplary processes described herein to obtain computed metrics characterizing a variation in the explainability of the machine-learning or artificial-intelligence process between the first temporal internal and corresponding ones of a threshold number of third temporal intervals (e.g., in step 620 of FIG. 6) and to determine, based on the one or more metric-specific exception criteria described herein, whether FI computing system 130 associates the metric value with the significant threshold exception during each of the third temporal intervals, and as such, whether the significant threshold exception persists throughout the second temporal interval and each of the third temporal intervals (e.g., in step 622). In some instances, each of the third temporal intervals may be subsequent to the first temporal interval (e.g., the reference date) and prior to the second temporal interval (e.g., the corresponding one of the successive monitoring intervals that includes the three-month quarter ranging from Oct. 1, 2024, to Dec. 31, 2024). As described herein, the threshold number of third temporal intervals may include four consecutive monitoring intervals that precede immediately the corresponding monitoring interval, such as, but not limited to, a first prior quarter ranging from Jul. 1, 2024, to Sep. 30, 2024, a second prior quarter ranging from Apr. 1, 2024, to Jun. 30, 2024, a third prior quarter ranging from Jan. 1, 2024, to Mar. 31, 2024, and a fourth prior quarter ranging from Oct. 1, 2023, to Dec. 31, 2023.

If FI computing system 130 were to establish that the metric value within at least one of the third temporal intervals fails to be associated with the significant threshold exception during each of the third temporal intervals, and FI computing system 130 may determine that the significant threshold exception fails to persist throughout the second temporal interval and each of the third temporal intervals (e.g., step 622; NO), and FI computing system 130 may perform operations that generate an alert message indicating the significant threshold exception during the second temporal interval, and transmit the alert message across communications network 120 to computing system or device 508. When presented by computing system or device 508 to analyst 510 via a corresponding computing device, prompts analyst 510 to investigate a cause of the significant, but not persistent, threshold exception associated with the machine-learning or artificial-intelligence process (e.g., in step 624 of FIG. 6). Exemplary process 600 is then complete in step 618.

Alternatively, if FI computing system 130 were to associate the metric value in each of the third temporal intervals with the significant threshold exception during each of the third temporal intervals, and FI computing system 130 may determine that the significant threshold exception persists throughout the second temporal interval and each of the third temporal intervals (e.g., step 622; YES), and FI computing system 130 may perform any of the exemplary processes described herein to modify programmatically at least one of (i) a value of a process parameter that characterizes the machine-learning or artificial-intelligence process (e.g., as maintained within process parameter data 168) and/or (ii) a composition of the input dataset (e.g., as maintained within composition data 170) associated with the machine-learning or artificial-intelligence process (e.g., in step 626 of FIG. 6). Exemplary process 600 is then complete in step 618.

C. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, including, but not limited to, application programming interface (API) 134, ingestion and pre-processing engine 136, training engine 146, training input module 148, adaptive training module 156, explainability module 162, process input engine 208, predictive engine 222, post-processing engine 230, explainability module 234, explainability monitoring engine 302, ingestion module 306, ranking module 314, rank correlation module 320, exception module 324, persistence module 336, process modification engine 350, Shapley deviation estimation module 406, feature selection module 408, discretization module 414, reference violation module 418, testing violation module 422, and aggregated violation module 426, can be implemented as one or more computer programs, i.e., one or more modules of computer program instructions encoded on a tangible non transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:

a memory storing instructions; and at least one processor coupled to the memory, the at least one processor being configured to execute the instructions to:

obtain first data characterizing an explainability of a machine-learning or artificial-intelligence process during a first temporal interval, and obtain second data characterizing the explainability of the machine-learning or artificial-intelligence process during a second temporal interval, the second temporal interval being subsequent to the first temporal interval, the first explainability data comprising associated pairs of first Shapley values and feature identifiers, the second explainability data comprising associated pairs of second Shapley values and the feature identifiers, and the feature identifiers being associated with features of the machine-learning or artificial intelligence process;

based on the first and second explainability data, determine a value of a metric that characterizes a variation in the explainability of the machine-learning or artificial-intelligence process between the first and second temporal intervals;

when the metric value is inconsistent with an exception criterion associated with the machine learning or artificial-intelligence process, obtain at least one additional value of the metric that characterizes an additional variation in the explainability of the machine-learning or artificial-intelligence process between the first temporal interval and a corresponding third temporal interval, the third temporal interval being subsequent to the first temporal interval and prior to the second temporal interval; and when the at least one additional metric value is inconsistent with the exception criterion, perform operations that modify at least one of (i) a value of a process parameter that characterizes the machine-learning or artificial-intelligence process or (ii) a composition of an input dataset associated with the machine-learning or artificial-intelligence process.

2. The apparatus of claim 1, wherein the machine-learning or artificial-intelligence process comprises a trained, gradient-boosted, decision-tree process.

3. The apparatus of claim 1, wherein the at least one processor is further configured to execute the instructions to:

generate a first ranked list of the feature identifiers based on the first explainability data, the feature identifiers being ranked within the first ranked list based on corresponding ones of the first Shapley values;

generate a second ranked list of the feature identifiers based on the second explainability data, the feature identifiers being ranked within the second ranked list based on corresponding ones of the second Shapley values; and perform operations that determine a value of a Kendall rank correlation coefficient based on the first ranked list of the feature identifiers and on the second ranked list of the feature identifiers, and that establish the value of the Kendall rank correlation coefficient as the metric value, the Kendall rank correlation coefficient being weighted in accordance with the first Shapley values.

4. The apparatus of claim 1, wherein the at least one processor is further configured to:

obtain at least one validation dataset associated with the first explainability data, and obtain at least one input dataset associated with second explainability data, the at least one validation dataset comprising associated pairs of first feature values and the feature identifiers, and the at least one input dataset comprising associated pairs of second feature values and the feature identifiers;

generate a plurality of reference data samples based on the first explainability data and the at least one validation dataset, and generate a plurality of testing data samples based on the second explainability data and the at least one input dataset, for corresponding ones of the feature identifiers, perform operations that:

determine at least one first confidence interval associated with the first Shapley values, and based on the at least one first confidence interval, determine one or more reference violation rates associated with the reference data samples;

determine at least one second confidence interval associated with the second Shapley values, and based on the at least one second confidence interval, determine one or more testing violation rate associated with the testing data samples; and determine an aggregate violation rate for the corresponding feature identifier based on the one or more reference violation rates and the one or more testing violation rates;

identify a subset of the feature identifiers associated with aggregate violation rates that exceed a threshold violation rate, and determine a number of feature identifiers within the identified subset; and compute a ratio of the determined number of feature identifiers within the identified subset and a threshold number of feature identifiers, and establish the computed ratio as the metric value.

5. The apparatus of claim 4, wherein each of the reference data samples comprise a corresponding one of the feature identifiers, a corresponding one of the first Shapley values, and a corresponding one of the first feature values, and each of the testing data samples comprising a corresponding one of the feature identifiers, a corresponding one of the second Shapley values, and a corresponding one of the second feature values.

6. The apparatus of claim 1, wherein:

the first explainability data is associated with an initial training or validation of the machine-learning or artificial-intelligence process on a corresponding reference date, the first temporal interval comprising the reference date; and the second explainability data is associated with an application of the machine-learning or artificial-intelligence process to an input dataset on a corresponding inferencing date within the second temporal interval.

7. The apparatus of claim 1, wherein the at least one processor is further configured to execute the instructions to:

obtain elements of scheduling data characterizing a monitoring schedule associated with the machine-earning or artificial-intelligence process, the scheduling data identifying a predetermined duration of the second temporal interval; and obtain the first explainability data and the second explainability data in accordance with the elements of scheduling data.

8. The apparatus of claim 1, wherein the at least one processor is further configured to obtain elements of exception criteria data that characterize the exception criterion associated with the machine-learning or artificial-intelligence process, the elements of exception criteria data associating a threshold value for the metric value with a threshold exception.

9. The apparatus of claim 8, wherein the at least one processor is further configured to execute the instructions to:

when the metric value exceeds the threshold value, determine that the metric value is inconsistent with the exception criteria, and associate the metric value with the threshold exception;

when the at least one additional metric value exceeds the threshold value, determine that the at least one additional metric value is inconsistent with the exception criteria, and associate the at least one additional metric value with the threshold exception;

determine that the threshold exception persists across the second and third temporal intervals based on the association of the metric value and the at least one additional metric value with the threshold exception; and perform the operations that modify the at least one of the value of the process parameter or the composition of the input dataset based on the determination that the threshold exception persists across the second and third temporal intervals.

10. The apparatus of claim 8, wherein the at least one processor is further configured to execute the instructions to:

when the metric value fails to exceed the threshold value, determine that the metric value is inconsistent with the exception criteria, and associate the metric value with the threshold exception;

when the at least one additional metric value fails to exceed the threshold value, determine that the at least one additional metric value is inconsistent with the exception criteria, and associate the at least one additional metric value with the threshold exception;

determine that the threshold exception persists across the second and third temporal intervals based on the association of the metric value and the at least one additional metric value with the threshold exception; and perform the operations that modify the at least one of the value of the process parameter or the composition of the input dataset based on the determination that the threshold exception persists across the second and third temporal intervals.

11. The apparatus of claim 1, wherein the at least one processor is further configured to execute the instructions to, when the at least one additional metric value is inconsistent with the exception criterion, perform additional operations that train further adaptively the machine-learning or artificial-intelligence process using training datasets associated with a first prior temporal interval, and using validation datasets associated with a second prior temporal interval.

12. A computer-implemented method, comprising:

obtaining, using at least one processor, first data characterizing an explainability of a machine-learning or artificial-intelligence process during a first temporal interval, and second data characterizing the explainability of the machine learning or artificial-intelligence process during a second temporal interval, the second temporal interval being subsequent to the first temporal interval, the first explainability data comprising associated pairs of first Shapley values and feature identifiers, the second explainability data comprising associated pairs of second Shapley values and the feature identifiers, and the feature identifiers being associated with features of the machine-learning or artificial intelligence process;

based on the first and second explainability data, determining, using the at least one processor, a value of a metric that characterizes a variation in the explainability of the machine-learning or artificial-intelligence process between the first and second temporal intervals;

when the metric value is inconsistent with an exception criterion associated with the machine learning or artificial-intelligence process, obtaining, using the at least one processor, at least one additional value of the metric characterizing an additional variation in the explainability of the machine-learning or artificial-intelligence process between the first temporal interval and a corresponding third temporal interval, the third temporal interval being subsequent to the first temporal interval and prior to the second temporal interval; and when the at least one additional metric value is inconsistent with the exception criterion, performing operations, using the at least one processor, that modify at least one of (i) a value of a process parameter that characterizes the machine-learning or artificial-intelligence process or (ii) a composition of an input dataset associated with the machine-learning or artificial-intelligence process.

13. The computer-implemented method of claim 12, wherein determining the metric value comprises:

generating a first ranked list of the feature identifiers based on the first explainability data, the feature identifiers being ranked within the first ranked list based on corresponding ones of the first Shapley values;

generating a second ranked list of the feature identifiers based on the second explainability data, the feature identifiers being ranked within the second ranked list based on corresponding ones of the second Shapley values; and performing operations that determine a value of a Kendall rank correlation coefficient based on the first ranked list of the feature identifiers and on the second ranked list of the feature identifiers, and that establish the value of the Kendall rank correlation coefficient as the metric value, the Kendall rank correlation coefficient being weighted in accordance with the first Shapley values.

14. The computer-implemented method of claim 12, wherein determining the metric value comprises:

obtaining at least one validation dataset associated with the first explainability data, and obtaining at least one input dataset associated with second explainability data, the at least one validation dataset comprising associated pairs of first feature values and the feature identifiers, and the at least one input dataset comprising associated pairs of second feature values and the corresponding feature identifiers;

generating a plurality of reference data samples based on the first explainability data and the at least one validation dataset, and generating a plurality of testing data samples based on the second explainability data and the at least one input dataset, for corresponding ones of the feature identifiers, performing operations that:

determine at least one first confidence interval associated with the first Shapley values, and based on the at least one first confidence interval, determine one or more reference violation rates associated with the reference data samples;

determine at least one second confidence interval associated with the second Shapley values, and based on the at least one second confidence interval, determine one or more testing violation rate associated with the testing data samples; and determine an aggregate violation rate for the corresponding feature identifier based on the one or more reference violation rates and the one or more testing violation rates;

identifying a subset of the feature identifiers associated with aggregate violation rates that exceed a threshold violation rate, and determine a number of feature identifiers within the identified subset; and computing a ratio of the determined number of feature identifiers within the identified subset and a threshold number of feature identifiers, and establishing the computed ratio as the metric value.

15. The computer-implemented method of claim 14, wherein each of the reference data samples comprise a corresponding one of the feature identifiers, a corresponding one of the first Shapley values, and a corresponding one of the first feature values, and each of the testing data samples comprising a corresponding one of the feature identifiers, a corresponding one of the second Shapley values, and a corresponding one of the second feature values.

16. The computer-implemented method of claim 12, wherein:

the first explainability data is associated with an initial training or validation of the machine-learning or artificial-intelligence process on a corresponding reference date, the first temporal interval comprising the reference date; and the second explainability data is associated with an application of the machine-learning or artificial-intelligence process to an input dataset on a corresponding infer- encing date within the second temporal interval.

17. The computer-implemented method of claim 12, further comprising, when the at least one additional metric value is inconsistent with the exception criterion, performing additional operations, using the at least one processor, that train further adaptively the machine-learning or artificial-intelligence process using training datasets associated with a first prior temporal interval, and using validation datasets associated with a second prior temporal interval.

18. A tangible, non-transitory computer-readable medium storing instructions that, when executed by at least one processor, cause the at least one processor to perform a method, comprising:

obtaining first data characterizing an explainability of a machine-learning or artificial-intelligence process during a first temporal interval, and second data characterizing the explainability of the machine learning or artificial-intelligence process during a second temporal interval, the second temporal interval being subsequent to the first temporal interval, the first explainability data comprising associated pairs of first Shapley values and feature identifiers, the second explainability data comprising associated pairs of second Shapley values and the feature identifiers, and the feature identifiers being associated with features of the machine-learning or artificial intelligence process;

based on the first and second explainability data, determining a value of a metric that characterizes a variation in the explainability of the machine-learning or artificial-intelligence process between the first and second temporal intervals;

when the metric value is inconsistent with an exception criterion associated with the machine learning or artificial-intelligence process, obtaining at least one additional value of the metric characterizing an additional variation in the explainability of the machine-learning or artificial-intelligence process between the first temporal interval and a corresponding third temporal interval, the third temporal interval being subsequent to the first temporal interval and prior to the second temporal interval; and when the at least one additional metric value is inconsistent with the exception criterion, performing operations that modify at least one of (i) a value of a process parameter that characterizes the machine-learning or artificial-intelligence process or (ii) a composition of an input dataset associated with the machine-learning or artificial-intelligence process.

* * * * *